US012608635B2

(12) United States Patent (10) Patent No.: US 12,608,635 B2
Seo et al. (45) Date of Patent: Apr. 21, 2026

(54) EFFICIENT QUANTUM MODULAR MULTIPLIER AND QUANTUM MODULAR MULTIPLICATION METHOD

(71) Applicant: INDUSTRY-UNIVERSITY COOPERATION FOUNDATION HANYANG UNIVERSITY ERICA CAMPUS, Ansan-si (KR)

(72) Inventors: Seung Hyun Seo, Ansan-si (KR); Seong Min Cho, Ansan-si (KR); Ae Young Kim, Ansan-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 615 days.

(21) Appl. No.: 18/017,655

(22) PCT Filed: Apr. 28, 2021

(86) PCT No.: PCT/KR2021/005372
§ 371 (c)(1),
(2) Date: Jan. 23, 2023

(87) PCT Pub. No.: WO2022/019443
PCT Pub. Date: Jan. 27, 2022

(65) Prior Publication Data
US 2023/0316121 A1 Oct. 5, 2023

(30) Foreign Application Priority Data

Jul. 24, 2020 (KR) ........................ 10-2020-0092365
Jul. 24, 2020 (KR) ........................ 10-2020-0092366

(51) Int. Cl.
*G06N 10/20* (2022.01)
*B82Y 10/00* (2011.01)
(Continued)

(52) U.S. Cl.
CPC .............. *G06N 10/20* (2022.01); *B82Y 10/00* (2013.01); *G06F 7/523* (2013.01); *G06N 10/00* (2019.01); *G06N 10/40* (2022.01); *G06N 10/80* (2022.01)

(58) Field of Classification Search
CPC ........ G06N 10/00; G06N 10/20; G06N 10/40; G06N 10/60; G06N 10/80; G06F 17/00; G06F 17/523; G06F 7/523; B82Y 10/00
See application file for complete search history.

(56) References Cited

U.S. PATENT DOCUMENTS 9,779,359 B2    10/2017 Svore et al.
10,320,360 B2 *  6/2019 Wiebe .................... G06F 17/17
(Continued)

FOREIGN PATENT DOCUMENTS

JP        2006-338185 A      12/2006
JP        2010-218513 A       9/2010
(Continued)

OTHER PUBLICATIONS

Häner, Thomas, et al. "Improved quantum circuits for elliptic curve discrete logarithms." arXiv preprint arXiv:2001.09580v1 (2020). ( Year: 2020).*
(Continued)

*Primary Examiner* — Andrew L Tank
(74) *Attorney, Agent, or Firm* — NKL Law; Jae Youn Kim

(57) ABSTRACT

Provided are an efficient quantum modular multiplier using characteristics of a modular operation, that is, a quantum modular multiplier having low quantum circuit complexity, and a quantum modular multiplication method. A quantum modular multiplier according to one embodiment of the present invention is a quantum modular multiplier for multiplying first qubits having N digits by second qubits having
(Continued)

N digits (N is a natural number that is greater than or equal to 2) and includes a first auxiliary register setting unit, a second auxiliary register setting unit, an addition unit, and an auxiliary register initialization unit.

16 Claims, 25 Drawing Sheets

(51) Int. Cl.

| | |
|---|---|
| *G06F 7/523* | (2006.01) |
| *G06N 10/00* | (2022.01) |
| *G06N 10/40* | (2022.01) |
| *G06N 10/80* | (2022.01) |

(56) References Cited

U.S. PATENT DOCUMENTS

| | | | | |
|---|---|---|---|---|
| 10,423,887 | B2 | 9/2019 | Roetteler et al. | |
| 11,250,190 | B2 * | 2/2022 | Pednault | G06F 17/16 |
| 11,526,463 | B2 * | 12/2022 | Maassen Van Den Brink | |
| | | | | G06F 15/76 |
| 11,823,010 | B2 * | 11/2023 | Niroula | G06N 10/40 |
| 2017/0286858 | A1 * | 10/2017 | La Cour | G06N 10/80 |
| 2018/0336015 | A1 * | 11/2018 | Roetteler | G06F 7/72 |
| 2018/0365583 | A1 * | 12/2018 | Cui | G06N 10/20 |
| 2019/0121921 | A1 * | 4/2019 | Nam | G06F 30/39 |
| 2019/0156242 | A1 * | 5/2019 | Haener | H04L 9/0852 |
| 2019/0205783 | A1 * | 7/2019 | Nam | G06F 17/14 |
| 2019/0361675 | A1 * | 11/2019 | Haener | G06N 10/20 |
| 2020/0089832 | A1 * | 3/2020 | Shao | G06N 10/20 |
| 2020/0118026 | A1 * | 4/2020 | Ashrafi | G02F 3/00 |
| 2020/0184024 | A1 * | 6/2020 | Nam | G06F 30/327 |
| 2020/0193072 | A1 * | 6/2020 | Johansson | G06F 7/722 |
| 2020/0364598 | A1 * | 11/2020 | Ashikhmin | H03M 13/611 |
| 2021/0027187 | A1 * | 1/2021 | Gidney | H03K 19/20 |
| 2021/0035008 | A1 * | 2/2021 | Gidney | H03K 19/195 |
| 2021/0287127 | A1 * | 9/2021 | Burkot | G06N 10/60 |
| 2021/0374307 | A1 * | 12/2021 | Haener | G06F 30/20 |
| 2021/0406749 | A1 * | 12/2021 | Oliver | H03M 13/6508 |
| 2022/0019928 | A1 * | 1/2022 | Jiang | G06F 15/16 |

FOREIGN PATENT DOCUMENTS

| | | | |
|---|---|---|---|
| KR | 10-2001-0086516 | A | 9/2001 |
| KR | 10-2003-0048243 | A | 6/2003 |
| KR | 10-2004-0045152 | A | 6/2004 |
| KR | 10-2008-0050226 | A | 6/2008 |
| KR | 10-2009-0090219 | A | 8/2009 |
| KR | 10-2204081 | B1 | 1/2021 |
| KR | 10-2214836 | B1 | 2/2021 |

OTHER PUBLICATIONS

Li, Panchi, et al. "Design of threshold segmentation method for quantum image." International Journal of Theoretical Physics 59.2 (2020): 514-538. (Year: 2020).*

Scherer, Wolfgang. "Quantum Gates and Circuits for Elementary Calculations." Mathematics of Quantum Computing: An Introduction. Cham: Springer International Publishing, 2019. 161-246. (Year: 2019).*

Asaka, Ryo, Kazumitsu Sakai, and Ryoko Yahagi. "Quantum circuit for the fast Fourier transform." arXiv preprint arXiv:1911.03055v1 (2019). (Year: 2019).*

Li, Panchi, et al. "Quantum representation and basic operations of digital signals." International Journal of Theoretical Physics 57.10 (2018): 3242-3270. (Year: 2018).*

Muñoz-Coreas, Edgard, and Himanshu Thapliyal. "T-count optimized design of quantum integer multiplication." arXiv preprint arXiv:1706.05113v1 (2017). (Year: 2017).*

Haner, Thomas, Martin Roetteler, and Krysta M. Svore. "Factoring using 2n+ 2 qubits with Toffoli based modular multiplication." arXiv preprint arXiv:1611.07995v2 (2017). (Year: 2017).*

Babu, Hafiz Md Hasan. "Cost-efficient design of a quantum multiplier-accumulator unit." Quantum Information Processing 16.1 (2017): 30. (Year: 2017).*

HV, Jayashree, et al. "Ancilla-input and garbage-output optimized design of a reversible quantum integer multiplier." arXiv preprint arXiv:1608.01228v1 (2016). (Year: 2016).*

Markov, Igor L., and Mehdi Saeedi. "Constant-optimized quantum circuits for modular multiplication and exponentiation." arXiv preprint arXiv:1202.6614v3 (2015). (Year: 2015).*

Maynard, Christopher M., and Einar Pius. "Integer arithmetic with hybrid quantum-classical circuits." arXiv preprint arXiv:1304.4069v1 (2013). (Year: 2013).*

Zhou, Xiao-Qi, et al. "Adding control to arbitrary unknown quantum operations." Nature communications 2.1 (2011): 413. (Year: 2011).*

Beauregard, Stéphane, Gilles Brassard, and Jose M. Fernandez. "Quantum arithmetic on Galois fields." arXiv preprint quant-ph/0301163v1 (2003). (Year: 2003).*

Ishizuka, Okihiko, et al. "VLSI design of a quaternary multiplier with direct generation of partial products." Proceedings 1997 27th International Symposium on Multiple-Valued Logic. IEEE, 1997. (Year: 1997).*

Rich Rines and Isaac Chuang, High Performance Quantum Modular Multipliers, (2018). Cornell University, ArXiv. https://doi.org/10.48550/arXiv.1801.01081.

* cited by examiner

EFFICIENT QUANTUM MODULAR MULTIPLIER AND QUANTUM MODULAR MULTIPLICATION METHOD

CROSS-REFERENCES TO RELATED APPLICATIONS

This application is a national stage application of International Application No. PCT/KR2021/005372 filed on Apr. 28, 2021, which claims priority from Korean Patent Application No. 10-2020-0092365 filed on Jul. 24, 2020 and Korean Patent Application No. 10-2020-0092366 filed on Jul. 24, 2020, which are incorporated herein by reference in their entirety.

FIELD OF THE INVENTION

The present invention relates to a quantum modular multiplier and a quantum modular multiplication method, and more particularly, to an efficient quantum modular multiplier using characteristics of a modular operation (modular $2^N$ operation or modular $2^N-1$ operation), that is, a quantum modular multiplier having low quantum circuit complexity, and a quantum modular multiplication method.

DISCUSSION OF RELATED ART

Quantum computers, which operate based on a quantum mechanical principle and a quantum phenomenon, use qubits, in which 0 and 1 can be simultaneously present, as a basic unit of information processing.

Due to the use of such qubits, quantum computers can simultaneously express and calculate a very large number of cases with a small number of qubits.

Since quantum computers are expected to have a superior computational speed as compared with conventional computers, the quantum computers are expected to be used not only in IT fields but also in various fields such as chemical, medical, and pharmaceutical fields.

Currently, the development of quantum computers is being led by several IT companies. D-WAVE Systems Inc. has developed a 128-qubit quantum computer using a quantum annealing technique, and recently, the development of quantum computers is being led by companies such as IBM Co. and Google Inc. In particular, Google Inc. has recently developed a quantum computer chip called "Sycamore" which has solved a problem, which would have taken 10,000 years to be calculated with the current best supercomputers, within 200 seconds, and has published the Sycamore in the journal Nature.

Quantum algorithms for utilizing the characteristics of such a quantum computer should be implemented and operated using quantum gates in order to maintain the quantal characteristics of qubits. That is, a plurality of operations used in quantum algorithms should also be implemented using quantum gates.

In particular, "quantum-classical" modular multiplication, in which one of input registers for multiplication is fixed as a classical parameter, is a basic operation required in most quantum algorithms. Quantum-quantum modular multiplication, in which two input registers for multiplication enter a quantum state, is an important basic operation used in elliptic curve calculations in quantum circuits.

Examples of a modular multiplication circuit implemented as a quantum circuit known to be conventionally efficient may include in-place "quantum-classical" modular multiplication circuits in which ripple carry and carrylookahead operations are applied to an exact division, Montgomery reduction, or Barrett reduction method.

The complexity of a quantum circuit is usually determined according to the number of Toffoli gates known to have large operation overhead, a quantum circuit depth of the Toffoli gate, and the number of qubits, and the above-described conventional modular multiplication circuits have $5n$ qubits, $20n^2$ gates, and a quantum circuit depth of $8n\log_2 n$.

SUMMARY OF THE INVENTION

Technical Problem

The present invention is directed to providing an efficient quantum modular multiplier using characteristics of a modular operation (modular $2^N$ operation or modular $2^N-1$ operation, that is, a quantum modular multiplier having low quantum circuit complexity, and a quantum modular multiplication method.

Technical Solution

According to an aspect of the present invention, there is provided a quantum modular multiplier for multiplying first qubits having N digits by second qubits having N digits (N is a natural number that is greater than or equal to 2), the quantum modular multiplier including a first auxiliary register setting unit configured to store partial products of a lowest first qubit among the first qubits and the second qubits in first auxiliary qubits, a second auxiliary register setting unit configured to left-shift partial products of a $p^{th}$ first qubit among the first qubits and the second qubits (p–1) times and store the partial products in second auxiliary qubits, wherein p is a natural number that is greater than or equal to 2 and less than or equal to N, an addition unit configured to perform modular addition on the first auxiliary qubits and the second auxiliary qubits and store a modular addition result in the first auxiliary qubits, and an auxiliary register initialization unit configured to initialize the second auxiliary qubits, wherein, while p increases from 2 to N, the second auxiliary register setting unit, the addition unit, and the auxiliary register initializing unit are repeatedly operated.

The first auxiliary register setting unit may include a plurality of first Toffoli gates configured to receive the lowest first qubit and a $q^{th}$ second qubit among the second qubits and output a $q^{th}$ first auxiliary qubit among the first auxiliary qubits, wherein q is a natural number that is less than or equal to N.

The second auxiliary register setting unit may include a plurality of second Toffoli gates configured to receive the $p^{th}$ first qubit and an $r^{th}$ second qubit among the second qubits and output a $(p+r-1)^{th}$ second auxiliary qubit among the second auxiliary qubits, wherein r is a natural number that is less than or equal to N–p+1.

The auxiliary register initialization unit may include a plurality of third Toffoli gates configured to receive the $p^{th}$ first qubit and the $r^{th}$ second qubit and output the $(p+r-1)^{th}$ second auxiliary qubit.

The addition unit may include a modular $2^N$ quantum adder configured to receive the first auxiliary qubits and the second auxiliary qubits and output the second auxiliary qubits.

According to another aspect of the present invention, there is provided a quantum modular multiplication method of multiplying first qubits having N digits by second qubits having N digits (N is a natural number that is greater than or equal to 2), the quantum modular multiplication method including a first auxiliary register setting operation of storing partial products of a lowest first qubit among the first qubits and the second qubits in first auxiliary qubits, a second auxiliary register setting operation of left-shifting partial products of a $p^{th}$ first qubit among the first qubits and the second qubits (p−1) times and storing the partial products in second auxiliary qubits, wherein p is a natural number that is greater than or equal to 2 and is less than or equal to N, an adding operation of performing modular addition on the first auxiliary qubits and the second auxiliary qubits and storing a modular addition result in the first auxiliary qubits, and an auxiliary resister initializing operation of initializing the second auxiliary qubits, wherein, while p increases from 2 to N, the second auxiliary register setting operation, the adding operation, and the auxiliary resister initializing operation are repeatedly performed.

The first auxiliary register setting operation may be performed using a plurality of first Toffoli gates configured to receive the lowest first qubit and a $q^{th}$ second qubit among the second qubits and output a $q^{th}$ first auxiliary qubit among the first auxiliary qubits, wherein q is a natural number that is less than or equal to N.

The second auxiliary register setting operation may be performed using a plurality of second Toffoli gates configured to receive the $p^{th}$ first qubit and an $r^{th}$ second qubit among the second qubits and output a $(r+p-1)^{th}$ second auxiliary qubit among the second auxiliary qubits, wherein r is a natural number that is less than or equal to N−p+1.

The auxiliary resister initializing operation may be performed using a plurality of third Toffoli gates configured to receive the $p^{th}$ first qubit and the $r^{th}$ second qubit and output the $(r+p-1)^{th}$ second auxiliary qubit an output.

The adding operation may be performed using a modular $2^N$ quantum adder configured to receive the first auxiliary qubits and the second auxiliary qubits and output the second auxiliary qubits.

According to still another aspect of the present invention, there is provided a quantum modular multiplier for multiplying first qubits having N digits by second qubits having N digits (N is a natural number that is greater than or equal to 2), the quantum modular multiplier including a plurality of auxiliary register setting units configured to left-shift partial products of an $f^{th}$ first qubit among the first qubits and the second qubits (f−1) times and store the partial products in an $f^{th}$ auxiliary register among a plurality of auxiliary registers, wherein f is a natural number that is less than or equal to N, and an addition unit configured to perform modular addition on the plurality of auxiliary registers and store a modular addition result in one of the plurality of auxiliary registers.

Each of the plurality of auxiliary register setting units may include a plurality of Toffoli gates configured to receive the $f^{th}$ first qubit and a $g^{th}$ second qubit among the second qubits and output an $(f+g-1)^{th}$ second auxiliary qubit among the second auxiliary qubits, wherein g is a natural number that is less than or equal to N−f+1.

The addition unit may include a plurality of modular $2^N$ quantum adders configured to perform the modular addition on the plurality of auxiliary registers in a tournament manner.

According to yet another aspect of the present invention, there is provided a quantum modular multiplication method of multiplying first qubits having N digits by second qubits having N digits (N is a natural number that is greater than or equal to 2), the quantum modular multiplication method including an auxiliary register setting operation of left-shifting partial products of an $f^{th}$ first qubit among the first qubits and the second qubits (f−1) times and storing the partial products in an $f^{th}$ auxiliary register among a plurality of auxiliary registers, wherein f is a natural number that is less than or equal to N, and an adding operation of performing modular addition on the plurality of auxiliary registers and storing a modular addition result in one of the plurality of auxiliary registers.

The auxiliary register setting operation may be performed using a plurality of Toffoli gates configured to receive the $f^{th}$ first qubit and a $g^{th}$ second qubit among the second qubits and output an $(f+g-1)^{th}$ second auxiliary qubit among the second auxiliary qubits, wherein g is a natural number that is less than or equal to N−f+1.

The adding operation may include performing modular $2^N$ addition on the plurality of auxiliary registers in a tournament manner.

According to yet another aspect of the present invention, there is provided a quantum modular multiplier for multiplying first qubits having N digits by second qubits having N digits (N is a natural number that is greater than or equal to 2), the quantum modular multiplier including a first auxiliary register setting unit configured to store partial products of a lowest first qubit among the first qubits and the second qubits in first auxiliary qubits, a second auxiliary register setting unit configured to left-circular-shift partial products of a $p^{th}$ first qubit among the first qubits and the second qubits (p−1) times and store the partial products in second auxiliary qubits, wherein p is a natural number that is greater than or equal to 2 and less than or equal to N, an addition unit configured to perform modular $2^N-1$ addition on the first auxiliary qubits and the second auxiliary qubits and store a modular addition result in the first auxiliary qubits, and an auxiliary register initialization unit configured to initialize the second auxiliary qubits, wherein, while p increases from 2 to N, the second auxiliary register setting unit, the addition unit, and the auxiliary register initializing unit are repeatedly operated.

The first auxiliary register setting unit may include a plurality of first Toffoli gates configured to receive the lowest first qubit and a $q^{th}$ second qubit among the second qubits and output a $q^{th}$ first auxiliary qubit among the first auxiliary qubits, wherein q is a natural number that is less than or equal to N.

The second auxiliary register setting unit may include a plurality of second Toffoli gates configured to receive the $p^{th}$ first qubit and an $r^{th}$ second qubit among the second qubits and output a (p+r−1)th second auxiliary qubit among the second auxiliary qubits, wherein r is a natural number that is less than or equal to N−p+1, and a plurality of third Toffoli gates configured to receive the $p^{th}$ first qubit and an $(N-p+1+s)^{th}$ second qubit among the second qubits and output an $s^{th}$ second auxiliary qubit among the second auxiliary qubits, wherein s is a natural number that is less than or equal to p−1.

The auxiliary register initialization unit may include a plurality of fourth Toffoli gates configured to receive the $p^{th}$ first qubit and the $r^{th}$ second qubit and output the $(p+r-1)^{th}$ second auxiliary qubit, and a plurality of fifth Toffoli gates configured to receive the $p^{th}$ first qubit and the $(N-p+1+s)^{th}$ second qubit and output the $s^{th}$ second auxiliary qubit.

The addition unit may include a modular $2^N-1$ quantum adder configured to receive the first auxiliary qubits and the second auxiliary qubits and output the second auxiliary qubits.

According to yet another aspect of the present invention, there is provided a quantum modular multiplication method of multiplying first qubits having N digits by second qubits having N digits (N is a natural number that is greater than or equal to 2), the quantum modular multiplication method including a first auxiliary register setting operation of storing partial products of a lowest first qubit among the first qubits and the second qubits in first auxiliary qubits, a second auxiliary register setting operation of left-circular-shifting partial products of a $p^{th}$ first qubit among the first qubits and the second qubits (p−1) times and storing the partial products in second auxiliary qubits, wherein p is a natural number that is greater than or equal to 2 and less than or equal to N, an adding operation of performing modular $2^N-1$ addition on the first auxiliary qubits and the second auxiliary qubits and storing a modular addition result in the first auxiliary qubits, and an initializing operation of initializing the second auxiliary qubits, wherein, while p increases from 2 to N, the second auxiliary register setting operation, the adding operation, and the auxiliary resister initializing operation are repeatedly performed.

The first auxiliary register setting operation may be performed using a plurality of first Toffoli gates configured to receive the lowest first qubit and a $q^{th}$ second qubit among the second qubits and output a $q^{th}$ first auxiliary qubit among the first auxiliary qubits, wherein q is a natural number that is less than or equal to N.

The second auxiliary register setting operation may be performed using a plurality of second Toffoli gates configured to receive the $p^{th}$ first qubit and an $r^{th}$ second qubit among the second qubits and output a $(p+r-1)^{th}$ second auxiliary qubit among the second auxiliary qubits, wherein r is a natural number that is less than or equal to N−p+1, and a plurality of third Toffoli gates configured to receive the $p^{th}$ first qubit and an $(N-p+1+s)^{th}$ second qubit among the second qubits and output an $s^{th}$ second auxiliary qubit among the second auxiliary qubits, wherein s is a natural number that is less than or equal to p−1.

The auxiliary resister initializing operation may be performed using a plurality of fourth Toffoli gates configured to receive the $p^{th}$ first qubit and the $r^{th}$ second qubit and output the $(p+r-1)^{th}$ second auxiliary qubit, and a plurality of fifth Toffoli gates configured to receive the $p^{th}$ first qubit and the $(N-p+1+s)^{th}$ second qubit and output the $s^{th}$ second auxiliary qubit.

The adding operation may be performed using a modular $2^N-1$ quantum adder configured to receive the first auxiliary qubits and the second auxiliary qubits and output the second auxiliary qubits.

According to yet another aspect of the present invention, there is provided a quantum modular multiplier for multiplying first qubits having N digits by second qubits having N digits (N is a natural number that is greater than or equal to 2), the quantum modular multiplier including a plurality of auxiliary register setting units configured to left-circular-shift partial products of an $f^{th}$ first qubit among the first qubits and the second qubits (f−1) times and store the partial products in an $f^{th}$ auxiliary register among a plurality of auxiliary registers, wherein f is a natural number that is less than or equal to N, and an addition unit configured to perform modular addition on the plurality of auxiliary registers and store a modular addition result in one of the plurality of auxiliary registers.

Each of the plurality of auxiliary register setting units may include a plurality of first Toffoli gates configured to receive the $f^{th}$ first qubit and a $g^{th}$ second qubit among the second qubits and output an $(f+g-1)^{th}$ second auxiliary qubit among the second auxiliary qubits, wherein g is a natural number that is less than or equal to N−f+1, and a plurality of second Toffoli gates configured to receive the $f^{th}$ first qubit and an $(N-f+1+t)^{th}$ second qubit among the second qubits and output a $t^{th}$ second auxiliary qubit among the second auxiliary qubits, wherein t is a natural number that is less than or equal to f−1.

The addition unit may include a plurality of modular $2^N-1$ quantum adders configured to perform the modular addition on the plurality of auxiliary registers in a tournament manner.

According to yet another aspect of the present invention, there is provided a quantum modular multiplication method of multiplying first qubits having N digits by second qubits having N digits (N is a natural number that is greater than or equal to 2), the quantum modular multiplication method including an auxiliary register setting operation of left-circular-shifting partial products of an $f^{th}$ first qubit among the first qubits and the second qubits (f−1) times and storing the partial products in an $f^{th}$ auxiliary register among a plurality of auxiliary registers, wherein f is a natural number that is less than or equal to N, and an adding operation of performing modular addition on the plurality of auxiliary registers and storing a modular addition result in one of the plurality of auxiliary registers.

The auxiliary register setting operation may be performed using a plurality of first Toffoli gates configured to receive the $f^{th}$ first qubit and a $g^{th}$ second qubit among the second qubits and output an $(f+g-1)^{th}$ second auxiliary qubit among the second auxiliary qubits, wherein g is a natural number that is less than or equal to N−f+1, and a plurality of second Toffoli gates configured to receive the $f^{th}$ first qubit and an $(N-f+1+t)^{th}$ second qubit among the second qubits and output a $t^{th}$ second auxiliary qubit among the second auxiliary qubits, wherein t is a natural number that is less than or equal to f−1.

The adding operation may include performing modular $2^N-1$ addition on the plurality of auxiliary registers in a tournament manner.

Advantageous Effects

The quantum modular multiplier and the quantum modular multiplication method according to an embodiment of the present invention can reduce the operation time by using the characteristics of modular operation (modular $2^N$ operation or modular $2^N-1$ operation), and the number of required qubits. And the number of gates can be reduced.

BRIEF DESCRIPTION OF THE DRAWINGS

A detailed description of each drawing is provided to more fully understand the drawings, which are incorporated in the detailed description of the present invention.

DETAILED DESCRIPTION OF EXEMPLARY EMBODIMENTS

Figure 1:
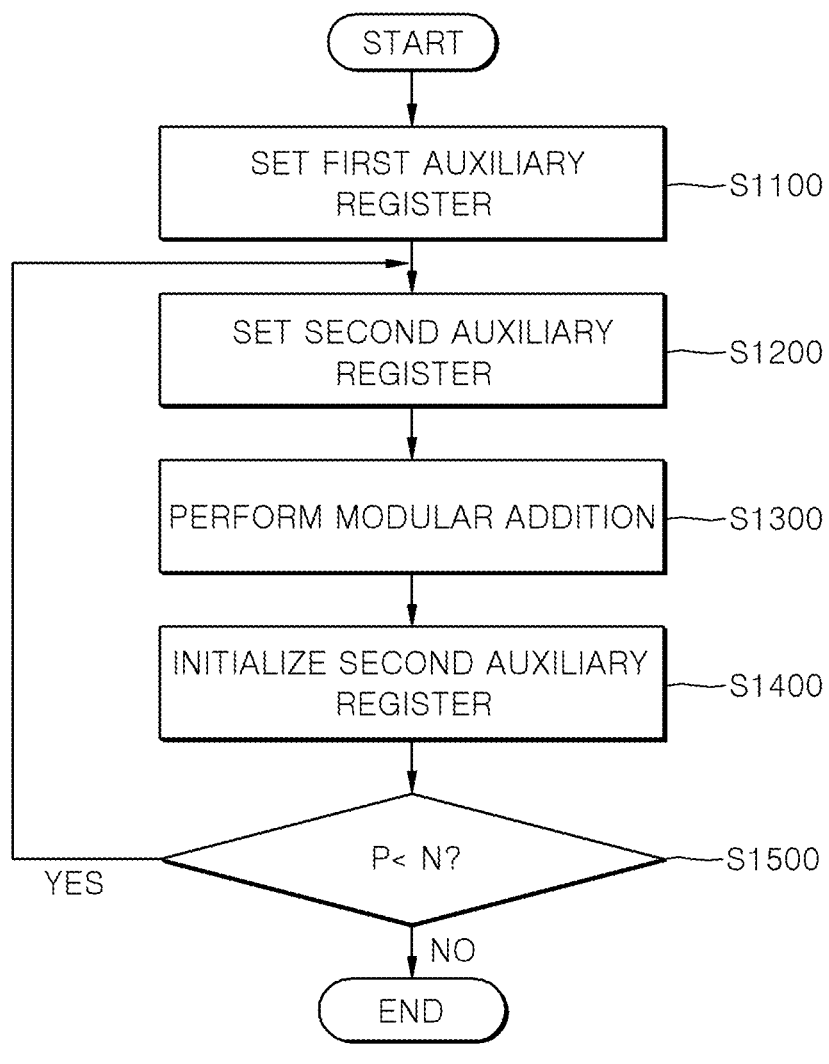
FIG. 1 is a flowchart for describing a quantum modular multiplication method according to a first embodiment of the present invention.

Structural or functional descriptions, which are specified with reference to embodiments according to the concept of the present invention set forth herein are merely provided to describe embodiments according to the concept of the present invention. Embodiments according to the concept of the present invention may, however, be embodied in different forms and should not be constructed as being limited to the embodiments set forth herein.

While the embodiments according to the concept of the present invention are susceptible to various modifications and alternative forms, specific embodiments thereof are shown by way of examples in the drawings and will herein be described in detail. However, the embodiments according to the concept of the present invention are not intended to be limited to specific disclosed forms. Rather, the present invention is to cover all modifications, equivalents, and alternatives falling within the spirit and scope of the invention.

While the terms such as "first" or "second," may be used to describe various components, such components should not be understood as being limited to the above terms. These terms are only used to distinguish one component from another component. For example, a first element could be termed a second element, and, similarly, a second element could be termed a first element, without departing from the scope of the inventive concept.

In the case that one component is described as being "connected" or "linked" to another component, it should be understood that the component be connected or linked directly to the corresponding component directly or other components may be present therebetween. On the other hand, in the case that one component is described as being "directly connected" or "directly linked" to another component, it should be understood that other components are not present therebetween. Other expressions describing relationships between components, such as "between" and "directly between" or "adjacent to" and "directly adjacent to" should be also understood likewise.

The terminology used herein is for the purpose of describing particular embodiments only and is not intended to be limiting of the invention. A singular expression includes a plural expression unless the context clearly indicates otherwise. It will further be understood that the terms "comprises" and/or "comprising." when used in this specification, specify the presence of stated features, integers, steps, operations, elements, components, and/or groups thereof but do not preclude the presence or addition of one or more other features, integers, steps, operations, elements, components, and/or groups thereof.

Unless defined otherwise, all the terms (including technical and scientific terms) used herein have the same meaning as commonly understood by one of ordinary skill in the art to which the present invention belongs. It will further be understood that terms such as those defined in commonly used dictionaries should be interpreted as having meanings that are consistent with their meanings in the context of the relevant art and should not be interpreted in an idealized or overly formal sense unless expressly defined otherwise herein.

Hereinafter, the present invention will be described in detail by describing exemplary embodiments of the present invention with reference to the accompanying drawings.

FIGS. 1 to 13 relate to a quantum modular multiplier and a quantum modular multiplication method based on characteristics of a modular $2^N$ operation.

Figure 2:
FIG. 2 is a block diagram illustrating a quantum modular multiplier according to the first embodiment of the present invention.

FIG. 1 is a flowchart for describing a quantum modular multiplication method according to a first embodiment of the present invention. FIG. 2 is a block diagram illustrating a quantum modular multiplier according to the first embodiment of the present invention.

Referring to FIGS. 1 and 2, a quantum modular multiplier 1100 may perform modular $2^N$ multiplication on a first qubit register A and a second qubit register B, which have N digits, in a serial manner, wherein N is a natural number that is greater than or equal to 2.

The first qubit register A may include N first qubits $a_1$ to $a_N$, and the second qubit register B may include N second qubits $b_1$ to $b_N$.

The quantum modular multiplier 1100 may include a first auxiliary register D and a second auxiliary register C, which have N digits, to perform multiplication on the first qubit register A and the second qubit register B which have N digits, wherein N is a natural number that is greater than or equal to 2.

The first auxiliary register D may include N first auxiliary qubits $d_1$ to $d_N$, and the second auxiliary register C may include N second auxiliary qubits $c_1$ to $c_N$.

While using the characteristics of a modular $2^N$ operation, the quantum modular multiplier 1100 may perform modular $2^N$ multiplication by adding partial products of the first qubits $a_1$ to $a_N$ and the second qubits $b_1$ to $b_N$.

When operations of the quantum modular multiplication method are sequentially described, the quantum modular multiplier 1100 may store partial products of a lowest first qubit $a_1$ among the first qubits $a_1$ to $a_N$ and the second qubits $b_1$ to $b_N$ in the first auxiliary qubits $d_1$ to $d_N$ (first auxiliary register setting operation S1100).

The quantum modular multiplier 1100 may left-shift partial products of a $p^{th}$ first qubit $a_P$ among the first qubits $a_1$ to $a_N$ and the second qubits $b_1$ to $b_N$ (p−1) times to store the partial products in the second auxiliary qubits $c_1$ to $c_N$, wherein p is a natural number that is greater than or equal to 2 and less than or equal to N (second auxiliary register setting operation S1200).

A left shift usually means that a value stored in a bit/qubit in a register is shifted to the left, that is, to a higher bit/qubit, and here, left-shifting a partial product (p−1) times to store the partial product means that the partial product is shifted to a higher qubit (p−1) times and stored. For example, a partial product of the first qubit $a_p$ and a $k^{th}$ second qubit may be stored in a $(ck+p−1)^{th}$ second auxiliary qubit $c_{k+p−1}$.

After the first auxiliary register D and the second auxiliary register C are set, the quantum modular multiplier 1100 may perform modular $2^N$ addition on the first auxiliary register D and the second auxiliary register C and may store a modular addition result in the first auxiliary register D (adding operation S1300).

After the adding operation is performed, the quantum modular multiplier 1100 may initialize the second auxiliary register C (auxiliary register initializing operation S1400).

While p increases from 2 to N, the quantum modular multiplier 1100 may repeatedly perform second auxiliary register setting operation S1200, adding operation S1300, and auxiliary register initializing operation S1400.

That is, the quantum modular multiplier 1100 may compare p with N and may return to second auxiliary register setting operation S1200 when p is less than N ("YES" branch of S1500).

On the other hand, when p is not less than N ("NO" branch of S1500), the quantum modular multiplier 1100 may end a multiplication operation.

That is, while p increases from 2 to N, the quantum modular multiplier 1100 may repeat a process of setting partial products of any one of the first qubits $a_1$ to $a_N$ and the second qubits $b_1$ to $b_N$ in the second auxiliary qubits $c_1$ to $c_N$ and adding the partial products to the first auxiliary qubits $d_1$ to $d_N$ in which a result of adding partial products is stored, thereby performing quantum modular multiplication.

The quantum modular multiplier 1100 may include a first auxiliary register setting unit 1110, (N−1) second auxiliary register setting units 1130-2 to 1130-N, (N−1) addition units 1150-2 to 1150-N, and (N−1) auxiliary register initialization units 1170-2 to 1170-N.

The first auxiliary register setting unit 1110 may store the partial products of the lowest first qubit a1 and the second qubits $b_1$ to $b_N$ in the first auxiliary qubits $d_1$ to $d_N$.

Figure 3:
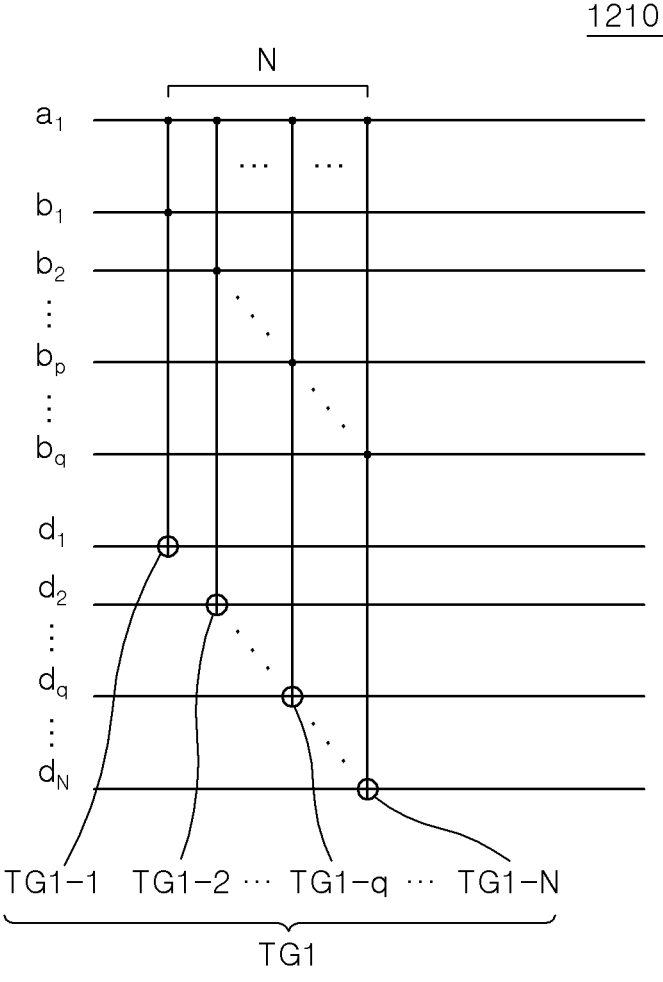
FIG. 3 is a circuit diagram illustrating a first auxiliary register setting unit shown in FIG. 2 in more detail.

FIG. 3 is a circuit diagram illustrating the first auxiliary register setting unit shown in FIG. 2 in more detail.

Referring to FIG. 3, the first auxiliary register setting unit 1110 may include N first Toffoli gates TG1-1 to TG1-N (hereinafter collectively referred to as TG1).

The "Toffoli gate" may be a Toffoli gate or a controlled-controlled-not gate, may be a gate that inverts a state of an output qubit when two inputs are "1," and may be represented by a matrix of Equation 1 below.

$$TG = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \\ 0 & 0 & 0 & 0 & 0 & 0 & 1 & 0 \end{bmatrix} \qquad \text{[Equation 1]}$$

Among the first Toffoli gates TG1-1 to TG1-N, a $q^{th}$ first Toffoli gate TG1-$q$ may receive a lowest first qubit $a_1$ and a $q^{th}$ second qubit $b_q$ among second qubits $b_1$ to $b_N$ and may output a $q^{th}$ first auxiliary qubit $d_q$ among first auxiliary qubits $d_1$ to $d_N$, wherein q is a natural number that is less than or equal to N.

That is, when both the lowest first qubit $a_1$ and the $q^{th}$ second qubit $b_q$ are "1," the $q^{th}$ first Toffoli gate TG1-$q$ may invert the $q^{th}$ first auxiliary qubit $d_q$.

Referring to FIGS. 1 and 2 again, each of the second auxiliary register setting units 1130-2 to 1130-N (hereinafter collectively referred to as 1130) may left-shift partial products of any one of the first qubits $a_2$ to $a_N$ except for the lowest first qubit a1 and the second qubits $b_1$ to $b_N$ and may store the partial products in second auxiliary qubits $c_1$ to $c_N$.

In other words, a $p^{th}$ second auxiliary register setting unit 1130-$p$ may left-shift partial products of the $p^{th}$ first qubit $a_p$ and the second qubits $b_1$ to $b_N$ (p−1) times to store the partial products in the second auxiliary qubits $c_1$ to $c_N$.

Figure 4:
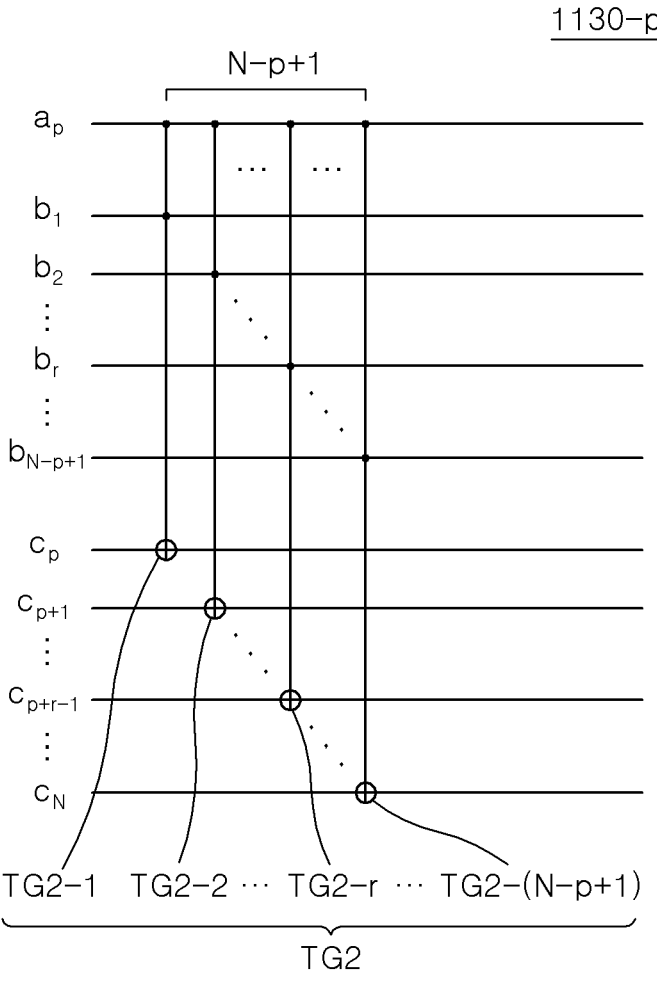
FIG. 4 is a circuit diagram illustrating a second auxiliary register setting unit shown in FIG. 2 in more detail.

FIG. 4 is a circuit diagram illustrating the second auxiliary register setting unit shown in FIG. 2 in more detail.

Referring to FIG. 4, the $p^{th}$ second auxiliary register setting unit 1130-$p$ may include (N−p+1) second Toffoli gates TG2-1 to TG2-(N−p+1) (hereinafter collectively referred to as TG2).

Among the second Toffoli gates TG2-1 to TG2-(N−p+1), an $r^{th}$ second Toffoli gate TG2-$r$ may receive a $p^{th}$ first qubit $a_p$ and an $r^{th}$ second qubit $b_r$ among second qubits $b_1$ to $b_N$ and may output a $(p+r−1)^{th}$ second auxiliary qubit $c_{p+r−1}$ among second auxiliary qubits $c_1$ to $c_N$, wherein r is a natural number that is less than or equal to N−p+1.

That is, when both the $p^{th}$ first qubit $a_p$ and the $r^{th}$ second qubit $b_r$ are "1," the $r^{th}$ second Toffoli gate TG2-$r$ may invert a state of the $(p+r−1)^{th}$ second auxiliary qubit $c_{p+r−1}$.

Referring to FIGS. 1 and 2 again, each of the addition units 1150-2 to 1150-N (hereinafter collectively referred to as 1150) may perform modular addition on first auxiliary qubits $d_1$ to $d_N$ and the second auxiliary qubits $c_1$ to $c_N$ and may store a modular addition result in the first auxiliary qubits $d_1$ to $d_N$.

The quantum modular multiplier 1100 is illustrated in FIG. 2 as including the plurality of addition units 1150-2 to 1150-N, but this is merely for convenience of description and does not limit the technical idea of the present invention.

For example, the quantum modular multiplier 1100 may include one addition unit 1150 and may be operated in a manner in which the addition unit 1150 is called whenever adding operation S1300 is performed.

The addition unit 1150 may include a modular $2^N$ quantum adder. For example, the addition unit 1150 may be provided as shown in FIG. 6.

Figure 6:
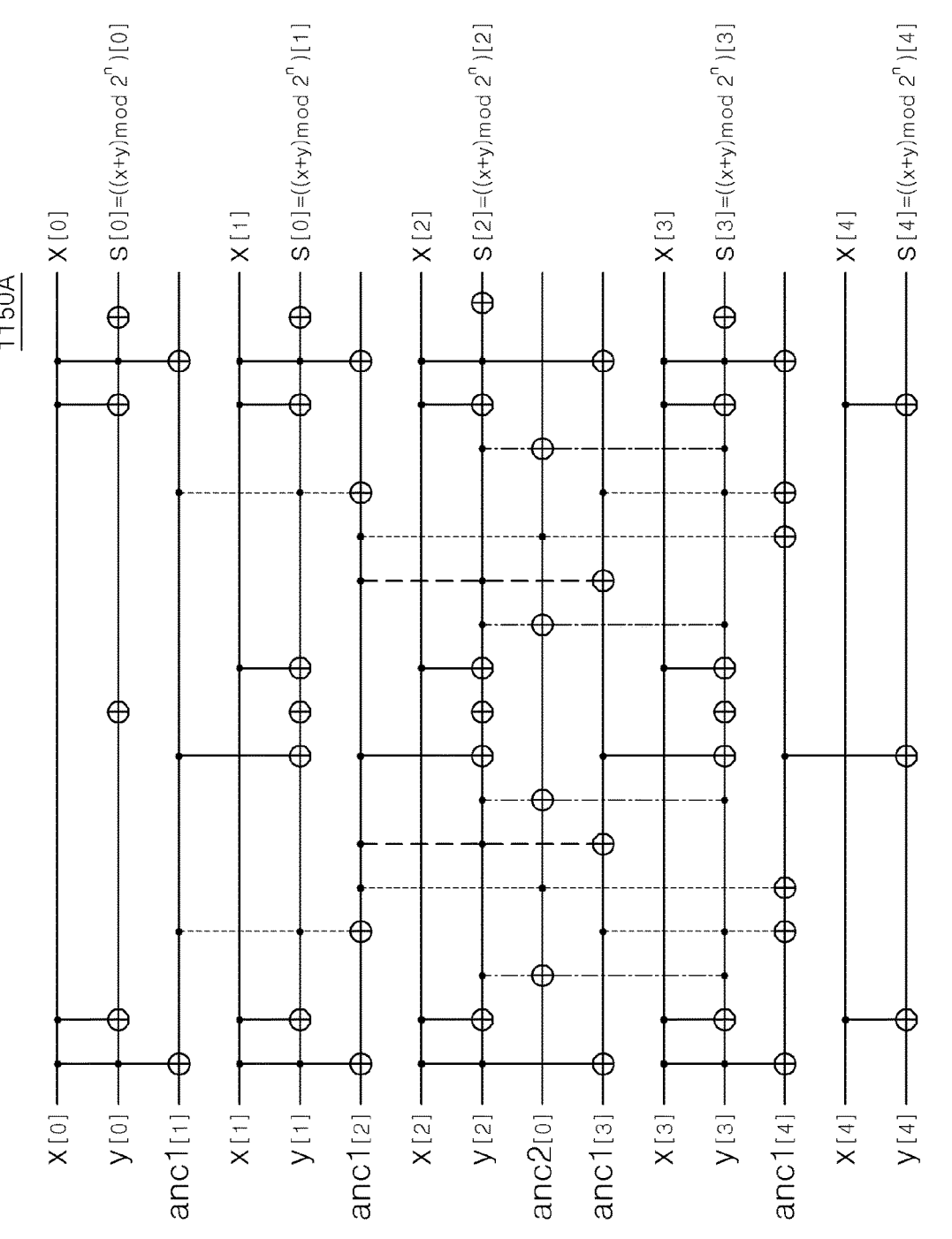
FIG. 6 is a circuit diagram illustrating an example of an addition unit shown in FIG. 2 in more detail.

FIG. 6 is a circuit diagram illustrating an example of the addition unit shown in FIG. 2 in more detail.

FIG. 6 shows an addition unit 1150A when N is 5, that is, when qubit registers A and B to be added have five digits.

The addition unit 1150 may include a plurality of Toffoli gates, a plurality of CNOT gates, and a plurality of NOT gates.

The "CNOT gate" may be a controlled-not gate, may be a gate that inverts a state of an output qubit when an input is "1," and may be represented by a matrix of Equation 2 below.

$$CNG = \begin{bmatrix} 1 & 0 & 0 & 0 \\ 0 & 1 & 0 & 0 \\ 0 & 0 & 0 & 1 \\ 0 & 0 & 1 & 0 \end{bmatrix}$$ [Equation 2]

The "CNOT gate" is represented by a line connecting one input ("•" sign) and one output ("+" sign in a circle).

The "NOT gate" may be a gate that inverts a state of a corresponding qubit and may be represented by a matrix of Equation 3 below.

$$NG = \begin{bmatrix} 0 & 1 \\ 1 & 0 \end{bmatrix}$$ [Equation 3]

The "NOT gate" is represented by a "+" sign in a circle.

The addition unit 1150 may further require auxiliary qubits to perform modular addition.

For example, the addition unit 1150A further requires additional auxiliary qubits anc1[1], anc1[2], anc1[3], anc1[4], and anc2[0].

The addition unit 1150A may perform modular $2^N$ addition on a first input register X having qubits x[0] to x[4] and a second register Y having qubits y[0] to y[4] and may store an addition result in the second register Y.

Referring to FIGS. 1 and 2 again, the auxiliary register initialization units 1170-2 to 1170-N (hereinafter collectively referred to as 1170) may initialize the second auxiliary register C.

To this end, the auxiliary register initialization units 1170-2 to 1170-N have the same structure and function as the second auxiliary register setting units 1130-2 to 1130-N.

That is, each of the auxiliary register initialization units 1170-2 to 1170-N may left-shift partial products of any one of first qubits $a_2$ to $a_N$ except for a lowest first qubit $a_1$ and second qubits $b_1$ to $b_N$ and may store the partial products in second auxiliary qubits $c_1$ to $c_N$.

In other words, a pt auxiliary register initialization unit 1170-$p$ may left-shift partial products of a $p^{th}$ first qubit $a_p$ and the second qubits $b_1$ to $b_N$ (p−1) times to store the partial products in the second auxiliary qubits $c_1$ to $c_N$.

Figure 5:
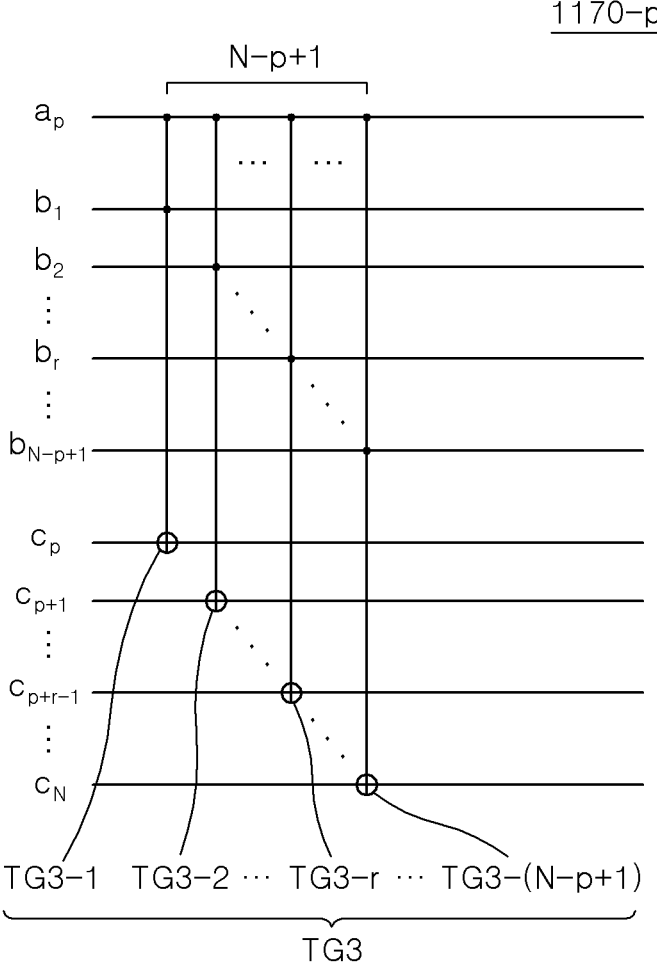
FIG. 5 is a circuit diagram illustrating an auxiliary register initialization unit shown in FIG. 2 in more detail.

FIG. 5 is a circuit diagram illustrating the auxiliary register initialization unit shown in FIG. 2 in more detail.

Referring to FIG. 5, the $p^{th}$ auxiliary register initialization unit 1170-$p$ may include (N−p+1) third Toffoli gates TG3-1 to TG3-(N−p+1) (hereinafter collectively referred to as TG3).

Among the third Toffoli gates TG3-1 to TG3-(N−p+1), an $r^{th}$ third Toffoli gate TG3-$r$ may receive a $p^{th}$ first qubit $a_p$ and an $r^{th}$ second qubit $b_r$ among second qubits $b_1$ to $b_N$ and may output a (p+r−1)th second auxiliary qubit $c_{p+r-1}$ among second auxiliary qubits $c_1$ to $c_N$, wherein r is a natural number that is less than or equal to N−p+1.

That is, when both the $p^{th}$ first qubit $a_p$ and the $r^{th}$ second qubit $b_r$ are "1," the $r^{th}$ third Toffoli gate TG3-$r$ may invert a state of the (p+r−1)th second auxiliary qubit $c_{p+r-1}$.

Figure 7:
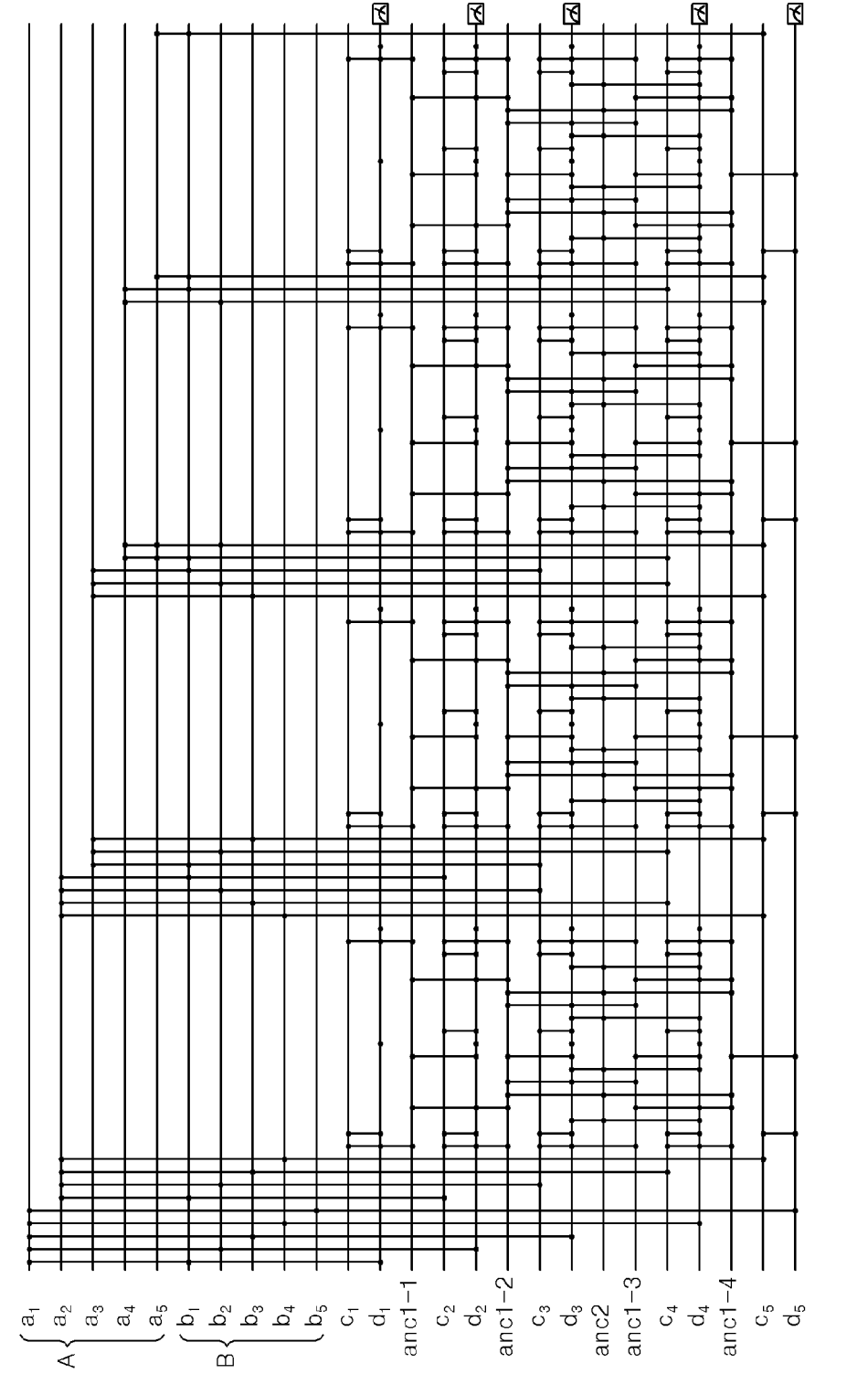
FIG. 7 is a circuit diagram illustrating an example of the quantum modular multiplier shown in FIG. 2 in more detail.

FIG. 7 is a circuit diagram illustrating an example of the quantum modular multiplier shown in FIG. 2 in more detail.

A quantum modular multiplier 1100A is an example of a circuit structure when N is 5, that is, when qubit registers A and B to be added have five digits.

The addition unit 1150A shown in FIG. 6 is applied to the quantum modular multiplier 1100A.

In addition to first auxiliary qubits $d_1$ to $d_5$ and second auxiliary qubits $c_1$ to $c_5$, the quantum modular multiplier 1100A requires five additional auxiliary qubits anc1-1 to anc1-4 and anc2.

The quantum modular multiplier 1100 requires 6N qubits and $11N^2$ gates when multiplying N-digit registers A and B and has a quantum circuit depth of $N^2/2$. That is, the quantum modular multiplier 1100 may perform a multiplication operation in a serial manner to reduce the numbers of qubits and gates.

Figure 8:
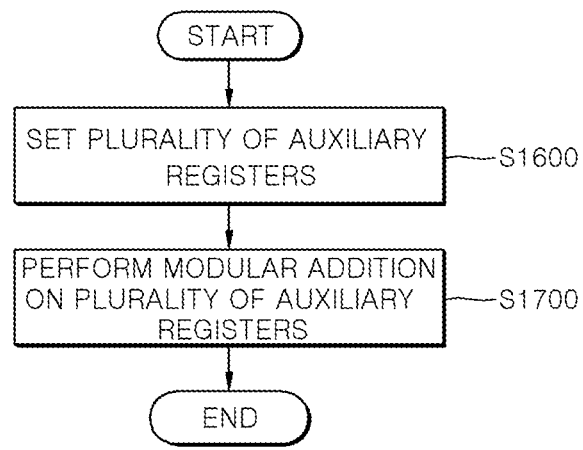
FIG. 8 is a flowchart for describing a quantum modular multiplication method according to a second embodiment of the present invention.
Figure 9:
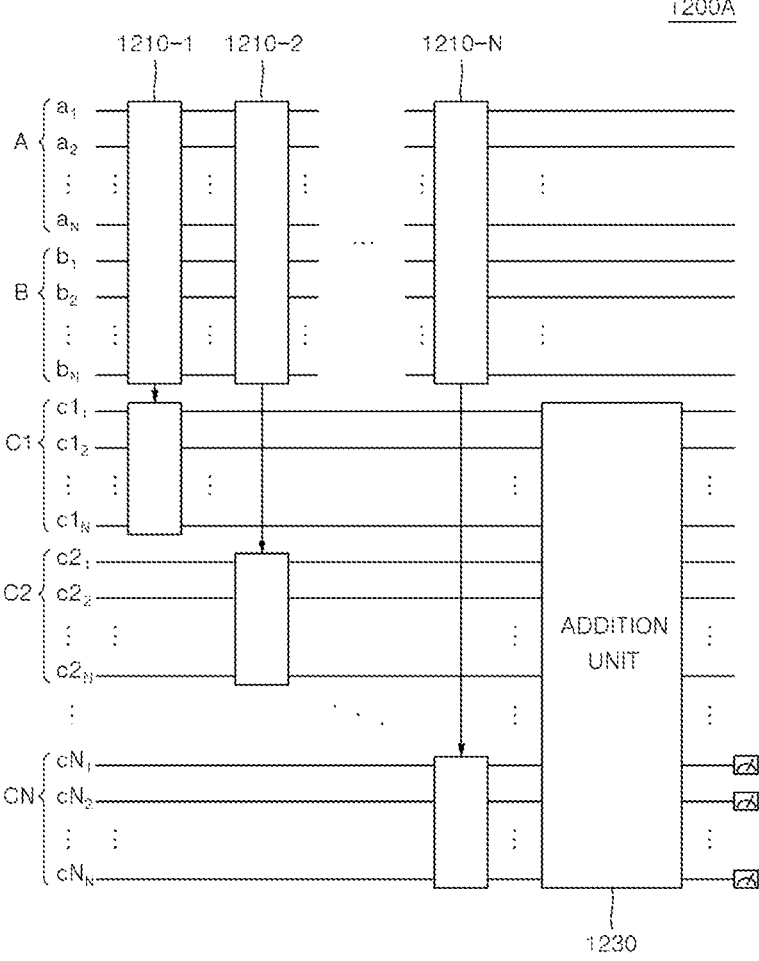
FIG. 9 is a block diagram illustrating a quantum modular multiplier according to the second embodiment of the present invention.

FIG. 8 is a flowchart for describing a quantum modular multiplication method according to a second embodiment of the present invention. FIG. 9 is a block diagram illustrating a quantum modular multiplier according to the second embodiment of the present invention.

Referring to FIGS. 8 and 9, a quantum modular multiplier 1200A may perform modular $2^N$ multiplication on a first qubit register A and a second qubit register B, which have N digits, in a parallel manner.

The quantum modular multiplier 1200A may include N auxiliary registers C1 to CN to perform multiplication on the first qubit register A and the second qubit register B which have N digits.

The auxiliary registers C1 to CN may include N auxiliary qubits cli to $c1_1$, $c2_1$ to $c2_N$, . . . , and $cN_1$ to $CN_N$, respectively.

The quantum modular multiplier 1200A may left-shift partial products of an $f^{th}$ first qubit $a_f$ among first qubits $a_1$ to $a_N$ and second qubits $b_1$ to $b_N$ (f−1) times to store the partial products in an $f^{th}$ auxiliary register Cf, wherein f is a natural number that is less than or equal to N (auxiliary register setting operation S1600).

After the auxiliary registers C1 to CN are all set, the quantum modular multiplier 1200A may perform modular $2^N$ addition on the auxiliary registers C1 to CN to store a modular addition result in one of the auxiliary registers C1 to CN, for example, an $N^{th}$ auxiliary register CN (adding operation S1700).

The quantum modular multiplier 1200A may perform modular $2^N$ addition on the auxiliary registers C1 to CN in a tournament manner to reduce a required calculation time.

That is, the quantum modular multiplier 1200A may set partial products of any one of the first qubits a to an and the second qubits $b_1$ to $b_N$ in the plurality of qubit registers C1 to CN and may perform modular addition on the qubit registers C1 to CN in a tournament manner to perform quantum modular multiplication.

The quantum modular multiplier 1200A may include N auxiliary register setting units 1210-1 to 1210-N (hereinafter collectively referred to as 1210) and an addition unit 1230.

Figure 10:
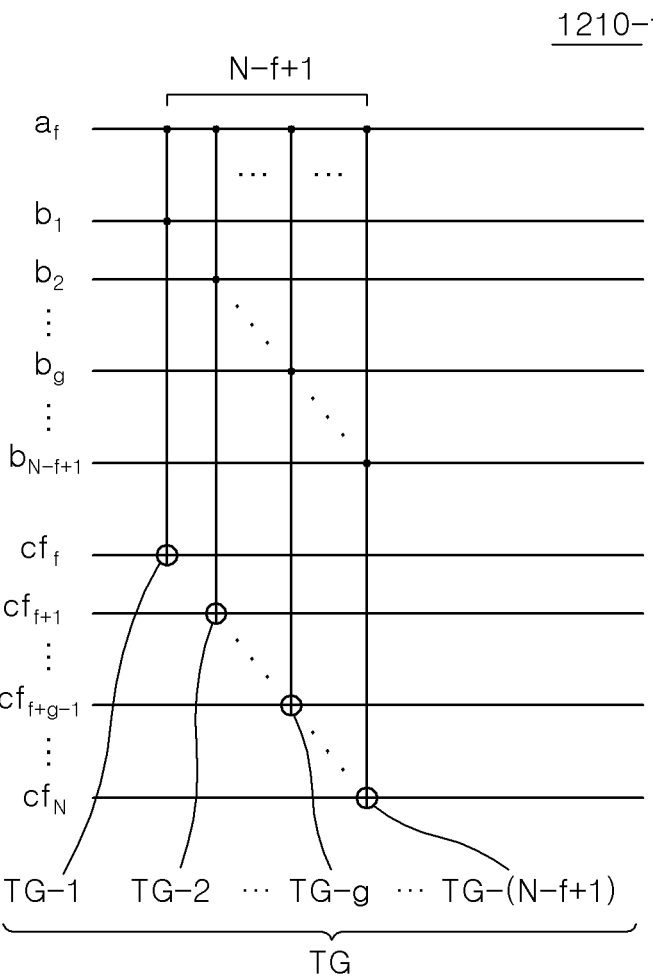
FIG. 10 is a circuit diagram illustrating an example of an auxiliary register setting unit shown in FIG. 9 in more detail.

FIG. 10 is a circuit diagram illustrating an example of the auxiliary register setting unit shown in FIG. 9 in more detail.

Referring to FIG. 10, an $f^{th}$ auxiliary register setting unit 1210-$f$ may include (N–$f$+1) Toffoli gates TG-1 to TG-(N–$f$+1).

Among the Toffoli gates TG-1 to TG-(N–$f$+1), a $g^{th}$ Toffoli gate TG-g may receive an $f^{th}$ first qubit $a_f$ among first qubits $a_1$ to $a_N$ and a $g^{th}$ second qubit $b_g$ among second qubits $b_1$ to $b_N$ and may output an $(f+g-1)^{th}$ auxiliary qubit $cf_{f+g-1}$ included in an $f^{th}$ auxiliary register Cf, wherein g is a natural number that is less than or equal to N–$f$+1.

That is, when both the $f^{th}$ first qubit $a_f$ and the $g^{th}$ second qubit $b_g$ are "1," the $g^{th}$ Toffoli gate TG-g may invert the $(f+g-1)^{th}$ auxiliary qubit $cf_{f+g-1}$ included in the $f^{th}$ auxiliary register Cf.

Figure 11:
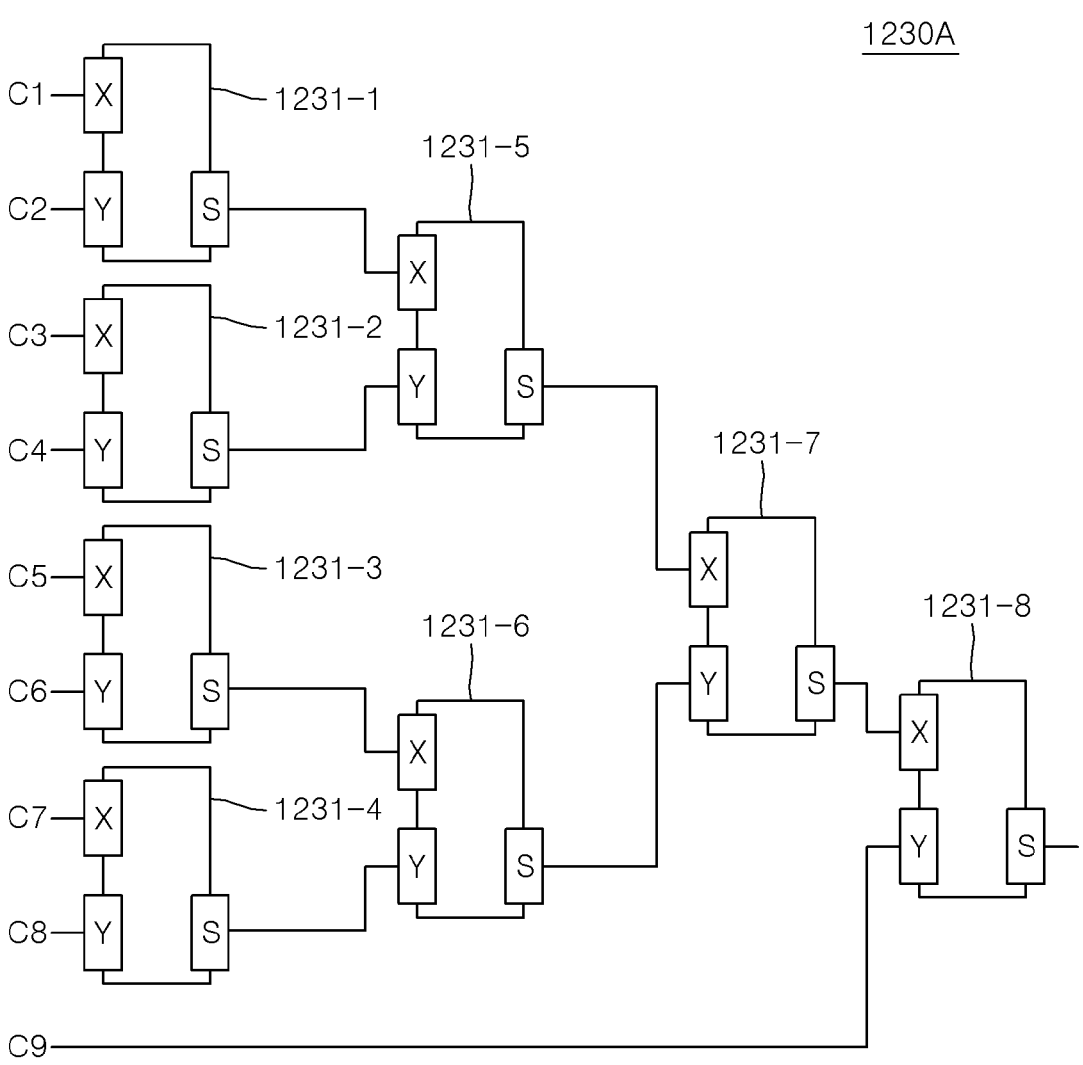
FIG. 11 is a block diagram illustrating an example of an addition unit shown in FIG. 9 in more detail.

FIG. 11 is a block diagram illustrating an example of the addition unit shown in FIG. 9 in more detail.

Referring to FIG. 11, an addition unit 1230A is shown when N is 9, that is, when qubit registers A and B to be added have nine digits.

The addition unit 1230 may include a plurality of modular $2^N$ quantum adders 1231. For example, the addition unit 1230A may include eight modular $2^N$ quantum adders 1231-1 to 1231-8 (hereinafter collectively referred to as 1231).

Each of the modular $2^N$ quantum adders 1231 may be provided as the addition unit 1150A shown in FIG. 6. However, a configuration of the addition unit 1150A is merely an example, and the technical spirit of the present invention is not limited thereto. For example, each of the modular $2^N$ quantum adders 1231 may be configured by being modified from the addition unit 1150A.

The modular $2^N$ quantum adders 1231 may perform modular $2^N$ addition on auxiliary registers C1 to C9 in a tournament manner.

In a first stage, the auxiliary registers C1 to C9 are paired and are subjected to modular $2^N$ addition by the modular $2^N$ quantum adders 1231-1 to 1231-4, and an addition result is stored in any one auxiliary register of a pair. In this case, since the number of the auxiliary registers C1 to C9 is odd, a ninth auxiliary register C9, which is not paired, is maintained without any change.

From a second stage, auxiliary registers storing a result of a previous stage are paired and are subjected to modular $2^N$ addition, and an addition result is stored in any one auxiliary register of a pair.

Finally, modular $2^N$ addition is performed in a tournament manner until a final addition result is stored in one auxiliary register.

Figure 12:
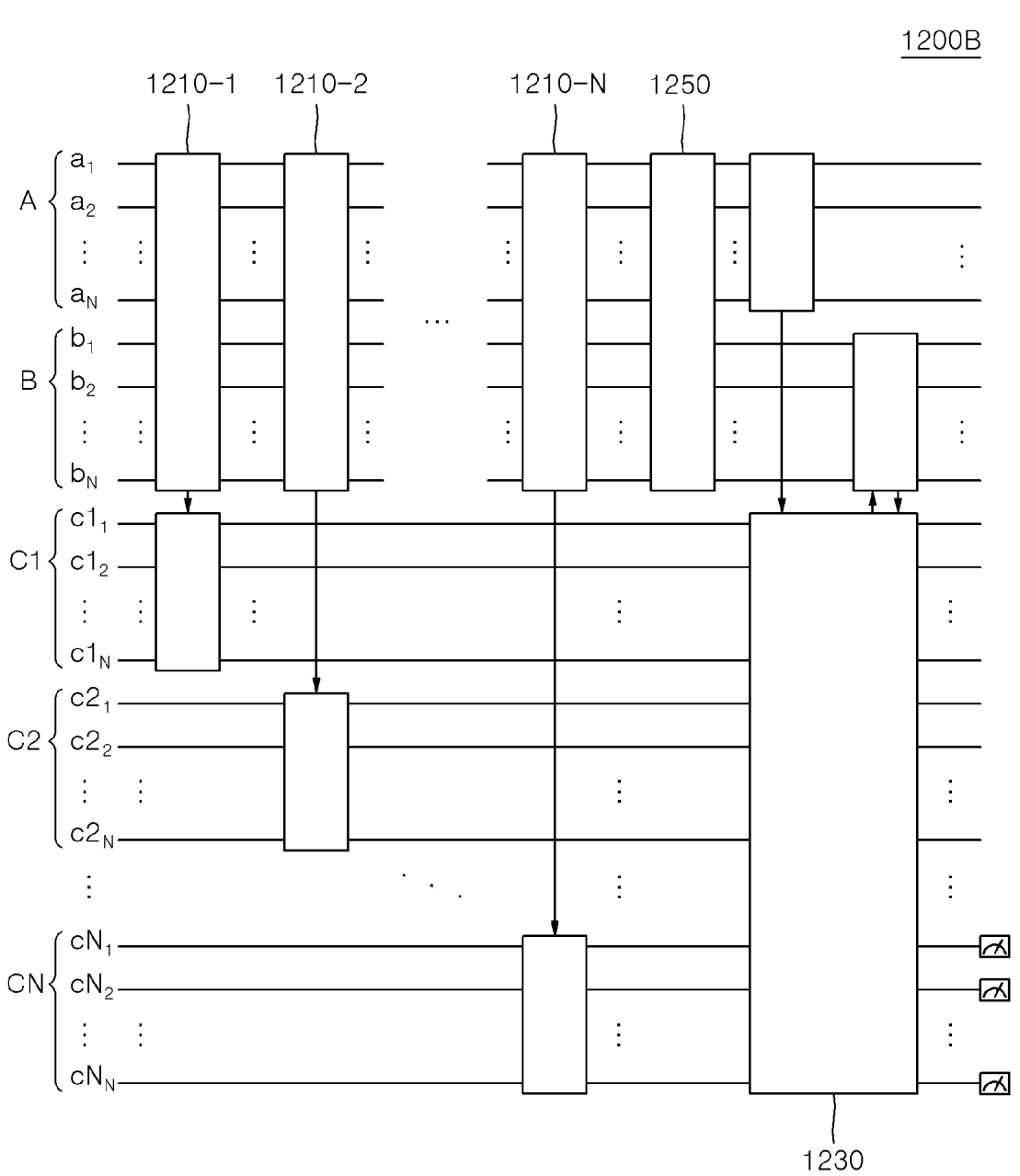
FIG. 12 is a block diagram illustrating a quantum modular multiplier according to a third embodiment of the present invention.

FIG. 12 is a block diagram illustrating a quantum modular multiplier according to a third embodiment of the present invention.

Since a quantum modular multiplier 1200B shown in FIG. 12 is substantially the same as the quantum modular multiplier 1200A shown in FIG. 9 except for a register initialization unit 1250, overlapping descriptions are omitted.

Referring to FIG. 12, the quantum modular multiplier 1200B may include the register initialization unit 1250.

After auxiliary registers C1 to CN are set by auxiliary register setting units 1210, the register initialization unit 1250 may initialize, that is, reset a first qubit register A and a second qubit register B.

The first qubit register A and the second qubit register B are initialized using the register initialization unit 1250, and initialized qubits $a_1$ to $a_N$ and $b_1$ to $b_N$ are used as additional qubits required when an addition unit 1230 performs modular addition, thereby reducing the number of qubits required by a system, that is, the quantum modular multiplier 1200B.

Figure 13:
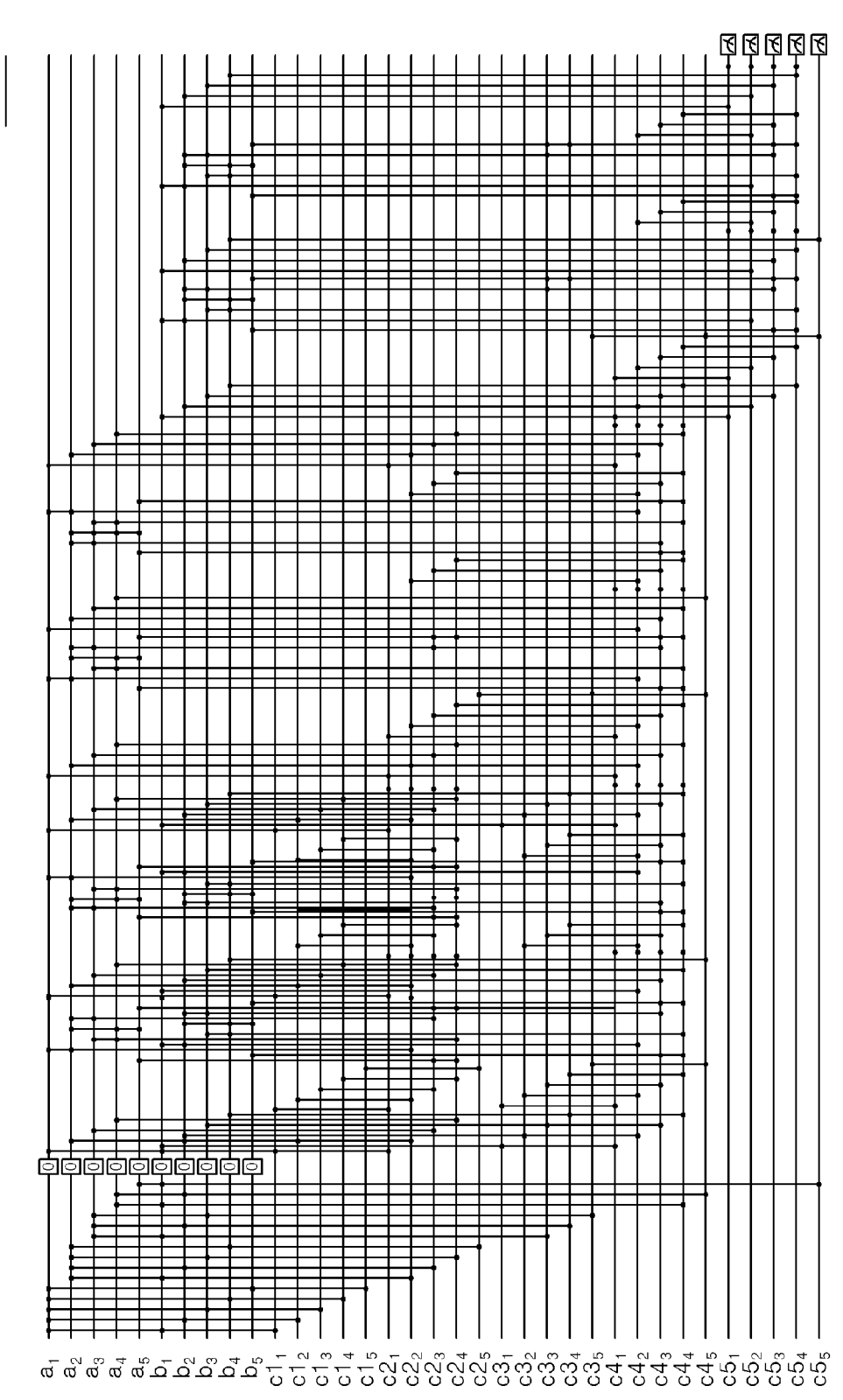
FIG. 13 is a circuit diagram illustrating an example of the quantum modular multiplier shown in FIG. 12 in more detail.

FIG. 13 is a circuit diagram illustrating an example of the quantum modular multiplier shown in FIG. 12 in more detail.

A quantum modular multiplier 1200C is an example of a circuit structure when N is 5, that is, when qubit registers A and B to be added have five digits.

The addition unit 1150A shown in FIG. 6 may be applied to quantum modular adders of the quantum modular multiplier 1200C. However, in order to reduce the number of gates, in some of the quantum modular adders, the addition unit 1150A may be modified, and for example, some of the gates may be omitted.

As described above, the addition unit 1150A further requires five additional auxiliary qubits anc1[1], anc1[2], anc1[3], anc1[4], and anc2[0] (see FIG. 6), but the initialized first qubit register A and second qubit register B are used in an adding operation instead of additional auxiliary qubits, thereby reducing the number of required qubits.

A quantum modular multiplier 1200 requires $N^2$ qubits and $5N^2$ gates when multiplying N-digit registers A and B and has a quantum circuit depth of 2N. That is, the quantum modular multiplier 1200 may perform a multiplication operation in a parallel manner to reduce a quantum circuit depth.

FIGS. 14 to 26 relate to a quantum modular multiplier and a quantum modular multiplication method based on characteristics of a modular $2^N-1$ operation.

Figure 14:
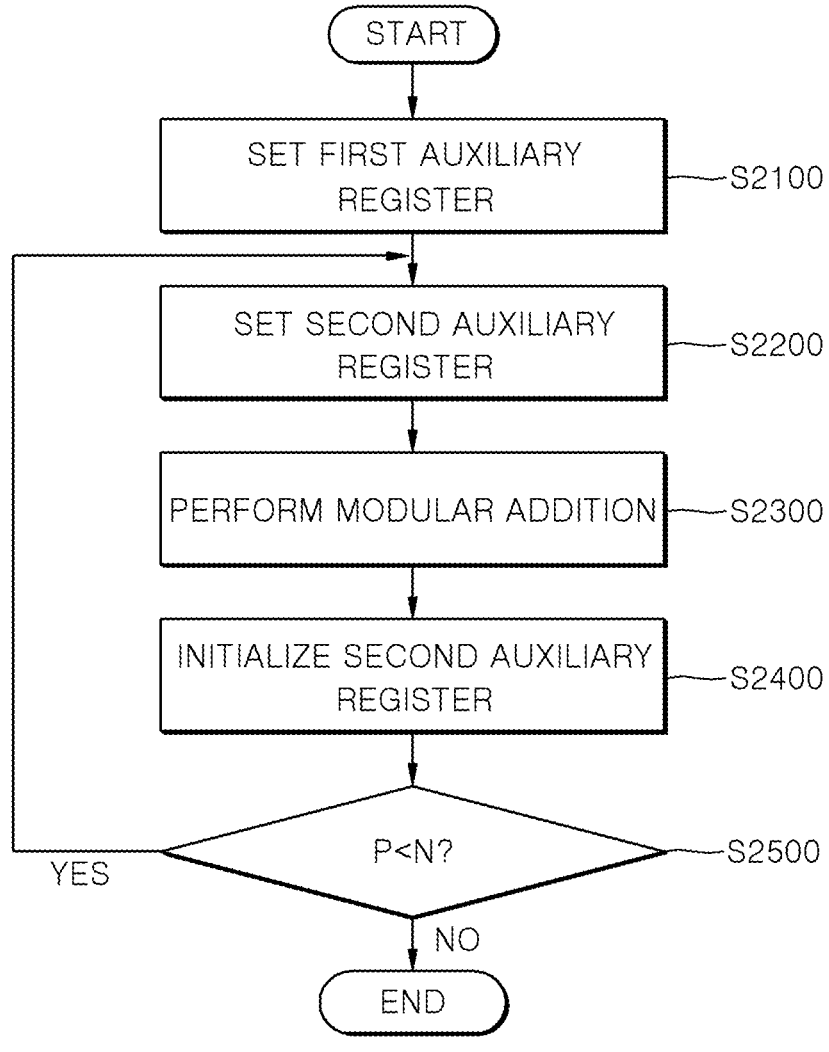
FIG. 14 is a flowchart for describing a quantum modular multiplication method according to a fourth embodiment of the present invention.
Figure 15:
FIG. 15 is a block diagram illustrating a quantum modular multiplier according to the fourth embodiment of the present invention.

FIG. 14 is a flowchart for describing a quantum modular multiplication method according to a fourth embodiment of the present invention. FIG. 15 is a block diagram illustrating a quantum modular multiplier according to the fourth embodiment of the present invention.

Referring to FIGS. 14 and 15, a quantum modular multiplier 2100 may perform modular $2^N-1$ multiplication on a first qubit register A and a second qubit register B, which have N digits, in a serial manner, wherein N is a natural number that is greater than or equal to 2.

The first qubit register A may include N first qubits $a_1$ to $a_N$, and the second qubit register B may include N second qubits $b_1$ to $b_N$.

The quantum modular multiplier 2100 may include a first auxiliary register D and a second auxiliary register C, which have N digits, to perform multiplication on the first qubit register A and the second qubit register B which have N digits, wherein N is a natural number that is greater than or equal to 2.

The first auxiliary register D may include N first auxiliary qubits $d_1$ to $d_N$, and the second auxiliary register C may include N second auxiliary qubits $c_1$ to $c_N$.

While using characteristics of a modular $2^N-1$ operation, the quantum modular multiplier 2100 may perform modular $2^N-1$ multiplication by adding partial products of the first qubits $a_1$ to $a_N$ and the second qubits $b_1$ to $b_N$.

When operations of the quantum modular multiplication method are sequentially described, the quantum modular multiplier 2100 may store partial products of a lowest first qubit $a_1$ among the first qubits $a_1$ to $a_N$ and the second qubits $b_1$ to $b_N$ in the first auxiliary qubits $d_1$ to $d_N$ (first auxiliary register setting operation S2100).

The quantum modular multiplier 2100 may left-circular-shift partial products of a $p^{th}$ first qubit $a_p$ among the first qubits $a_1$ to $a_N$ and the second qubits $b_1$ to $b_N$ (p−1) times to store the partial products in the second auxiliary qubits $c_1$ to $c_N$, wherein p is a natural number that is greater than or equal to 2 and less than or equal to N (second auxiliary register setting operation S2200).

In general, a left circular shift means that a value stored in a bit/qubit in a register is shifted to the left, that is, to a higher bit/qubit, and a value stored in a highest bit/qubit is shifted to an opposite end, that is, a lowest bit/qubit without being discarded.

Here, left-circular-shifting partial products (p−1) times to store the partial products means that the partial products are shifted to a higher qubit (p−1) times and stored, and in this case, values stored in higher (p−1) qubits are shifted to lower qubits and stored without being discarded.

For example, a partial product of the first qubit $a_p$ and a $k^{th}$ second qubit may be stored in a $(ck+p-1)^{th}$ second auxiliary qubit $c_{k+p-1}$.

After the first auxiliary register D and the second auxiliary register C are set, the quantum modular multiplier 2100 may perform modular $2^N-1$ addition on the first auxiliary register D and the second auxiliary register C and may store a modular addition result in the first auxiliary register D (adding operation S2300).

After the adding operation is performed, the quantum modular multiplier 2100 may initialize the second auxiliary register C (auxiliary register initializing operation S2400).

While p increases from 2 to N, the quantum modular multiplier 2100 may repeatedly perform second auxiliary register setting operation S2200, adding operation S2300, and auxiliary register initializing operation S2400.

That is, the quantum modular multiplier 2100 may compare p with N and may return to second auxiliary register setting operation S2200 when p is less than N ("YES" branch of S2500).

On the other hand, when p is not less than N ("NO" branch of S2500), the quantum modular multiplier 2100 may end a multiplication operation.

That is, while p increases from 2 to N, the quantum modular multiplier 2100 may repeat a process of setting partial products of any one of the first qubits $a_1$ to $a_N$ and the second qubits $b_1$ to $b_N$ in the second auxiliary qubits $c_1$ to $c_N$ and adding the partial products to the first auxiliary qubits $d_1$ to $d_N$ in which a result of adding partial products is stored, thereby performing quantum modular multiplication.

The quantum modular multiplier 2100 may include a first auxiliary register setting unit 2110, (N−1) second auxiliary register setting units 2130-2 to 2130-N, (N−1) addition units 2150-2 to 2150-N, and (N−1) auxiliary register initialization units 2170-2 to 2170-N.

The first auxiliary register setting unit 2110 may store the partial products of the lowest first qubit $a_1$ and the second qubits $b_1$ to $b_N$ in the first auxiliary qubits $d_1$ to $d_N$.

Figure 16:
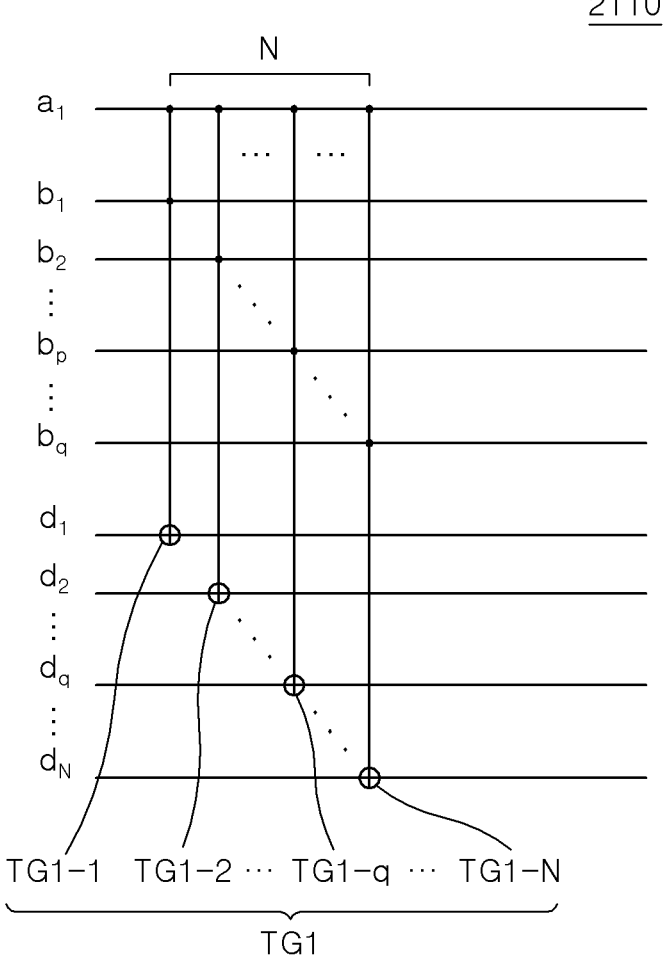
FIG. 16 is a circuit diagram illustrating a first auxiliary register setting unit shown in FIG. 15 in more detail.

FIG. 16 is a circuit diagram illustrating the first auxiliary register setting unit shown in FIG. 15 in more detail.

Referring to FIG. 16, the first auxiliary register setting unit 2110 may include N first Toffoli gates TG1-1 to TG1-N (hereinafter collectively referred to as TG1).

The "Toffoli gate" may be a Toffoli gate or a controlled-controlled-not gate, may be a gate that inverts a state of an output qubit when two inputs are "1," and may be represented by a matrix of Equation 1 below.

$$TG = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \\ 0 & 0 & 0 & 0 & 0 & 0 & 1 & 0 \end{bmatrix} \qquad \text{[Equation 1]}$$

Among the first Toffoli gates TG1-1 to TG1-N, a $q^{th}$ first Toffoli gate TG1-$q$ may receive a lowest first qubit $a_1$ and a $q^{th}$ second qubit $b_q$ among second qubits $b_1$ to $b_N$ and may output a $q^{th}$ first auxiliary qubit $d_q$ among first auxiliary qubits $d_1$ to $d_N$, wherein q is a natural number that is less than or equal to N.

That is, when both the lowest first qubit $a_1$ and the $q^{th}$ second qubit $b_q$ are "1," the $q^{th}$ first Toffoli gate TG1-$q$ may invert the $q^{th}$ first auxiliary qubit $d_q$.

Referring to FIGS. 14 and 15 again, each of the second auxiliary register setting units 2130-2 to 2130-N (hereinafter collectively referred to as 2130) may left-circular-shift partial products of any one of the first qubits $a_2$ to $a_N$ except for the lowest first qubit $a_1$ and the second qubits $b_1$ to $b_N$ and may store the partial products in second auxiliary qubits $c_1$ to $c_N$.

In other words, a $p^{th}$ second auxiliary register setting unit 2130-$p$ may left-circular-shift partial products of a $p^{th}$ first qubit $a_p$ and the second qubits $b_1$ to $b_N$ (p−1) times to store the partial products in the second auxiliary qubits $c_1$ to $c_N$.

Figure 17:
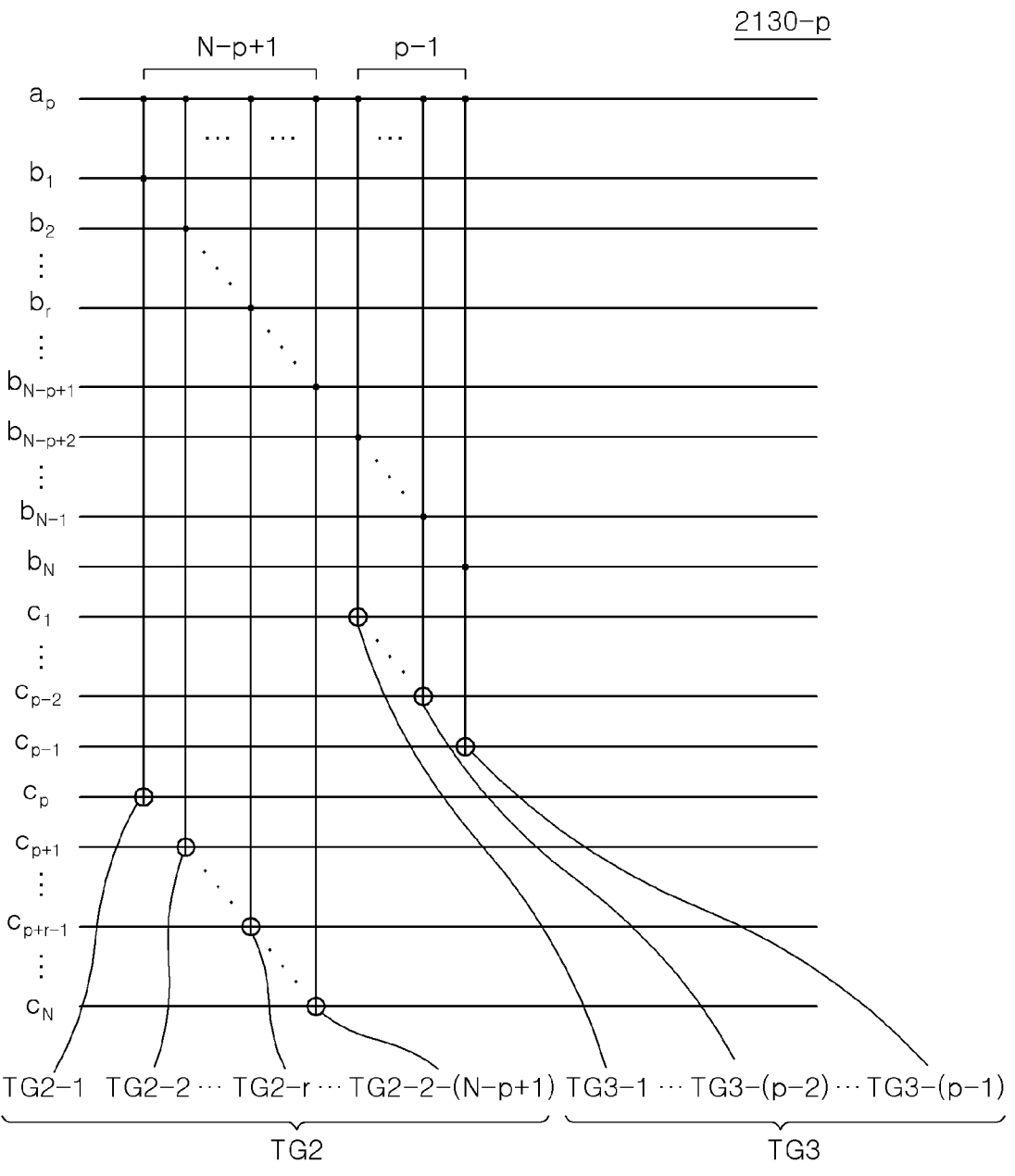
FIG. 17 is a circuit diagram illustrating a second auxiliary register setting unit shown in FIG. 15 in more detail.

FIG. 17 is a circuit diagram illustrating the second auxiliary register setting unit shown in FIG. 15 in more detail.

Referring to FIG. 17, the $p^{th}$ second auxiliary register setting unit 2130-$p$ may include (N−p+1) second Toffoli gates TG2-1 to TG2-(N−p+1) (hereinafter collectively referred to as TG2) and (p−1) third Toffoli gates TG3-1 to Tg3-(p−1) (hereinafter collectively referred to as TG3).

Among the second Toffoli gates TG2-1 to TG2-(N−p+1), an $r^{th}$ second Toffoli gate TG2-$r$ may receive a $p^{th}$ first qubit $a_p$ and an $r^{th}$ second qubit $b_r$ among second qubits $b_1$ to $b_N$ and may output a $(p+r-1)^{th}$ second auxiliary qubit $c_{p+r-1}$ among second auxiliary qubits $c_1$ to $c_N$, wherein r is a natural number that is less than or equal to N−p+1.

That is, when both the $p^{th}$ first qubit $a_p$ and the $r^{th}$ second qubit $b_r$ are "1," the $r^{th}$ second Toffoli gate TG2-$r$ may invert a state of the $(p+r-1)^{th}$ second auxiliary qubit $c_{p+r-1}$.

Among the third Toffoli gates TG3-1 to TG3-(p−1), an $s^{th}$ third Toffoli gate may receive the $p^{th}$ first qubit $a_p$ and an $(N-p+1+s)^{th}$ second qubit $b_r$ among the second qubits $b_1$ to $b_N$ and may output an $s^{th}$ second auxiliary qubit among the second auxiliary qubits $c_1$ to $c_N$, wherein s is a natural number that is less than or equal to p−1.

That is, when both the $p^{th}$ first qubit $a_p$ and the $(N-p+1+s)^{th}$ second qubit are "1," the $s^{th}$ third Toffoli gate TG3 may invert a state of a $(p+r-1)^{th}$-$s^{th}$ second auxiliary qubit.

Referring to FIGS. 14 and 15 again, each of the addition units 2150-2 to 2150-N (hereinafter collectively referred to as 2150) may perform modular addition on first auxiliary qubits $d_1$ to $d_N$ and the second auxiliary qubits $c_1$ to $c_N$ and may store a modular addition result in the first auxiliary qubits $d_1$ to $d_N$.

The quantum modular multiplier 2100 is illustrated in FIG. 15 as including the plurality of addition units 2150-2 to 2150-N, but this is merely for convenience of description and does not limit the technical idea of the present invention.

For example, the quantum modular multiplier 2100 may include one addition unit 2150 and may be operated in a manner in which the addition unit 2150 is called whenever adding operation S2300 is performed.

The addition unit 2150 may include a modular $2^N-1$ quantum adder. For example, the addition unit 2150 may be provided as shown in FIG. 19.

Figure 19:
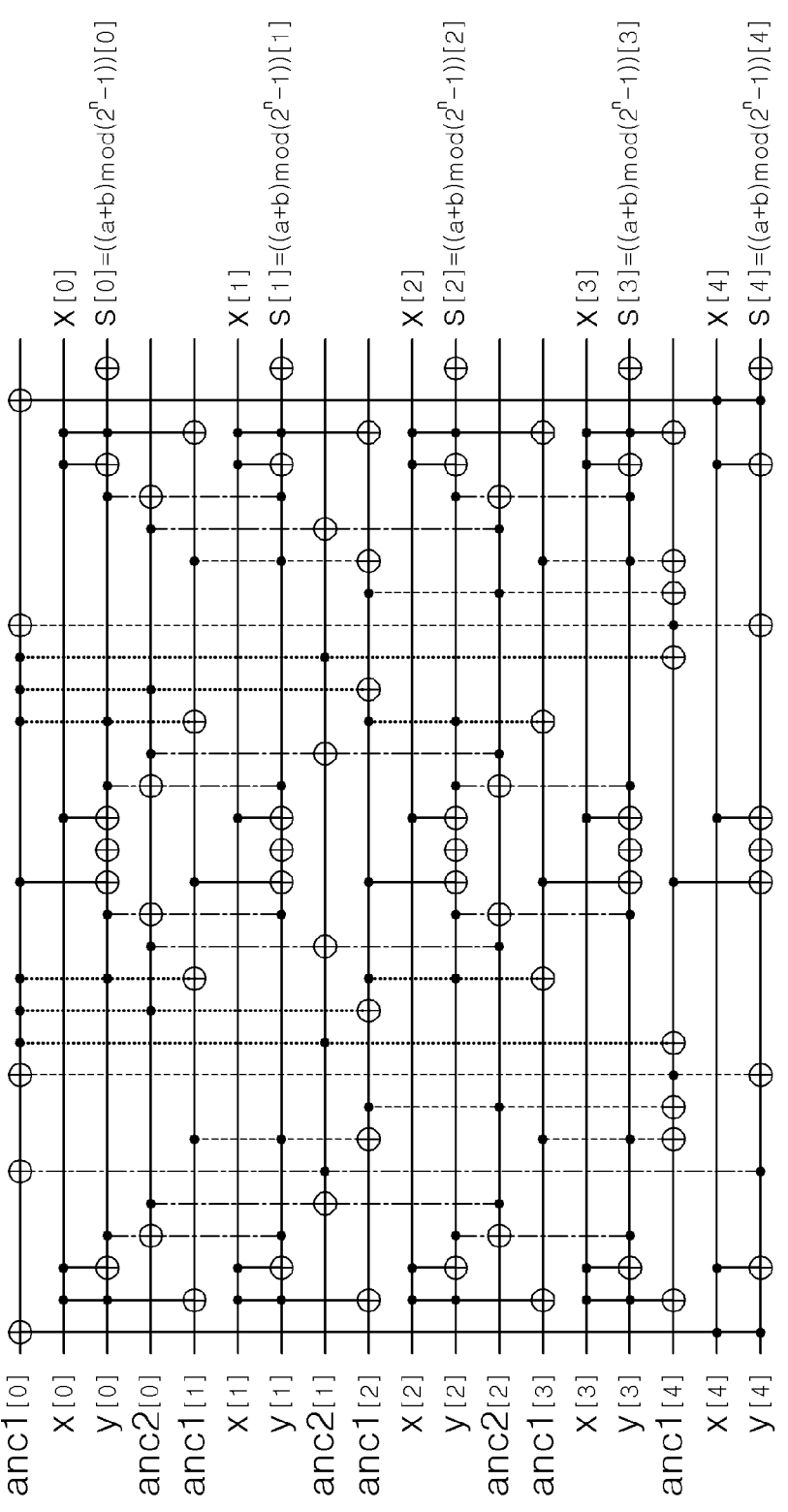
FIG. 19 is a circuit diagram illustrating an example of an addition unit shown in FIG. 15 in more detail.

FIG. 19 is a circuit diagram illustrating an example of the addition unit shown in FIG. 15 in more detail.

FIG. 19 shows an addition unit 2150A when N is 5, that is, when qubit registers A and B to be added have five digits.

The addition unit 2150 may include a plurality of Toffoli gates, a plurality of CNOT gates, and a plurality of NOT gates.

The "CNOT gate" may be a controlled-not gate, may be a gate that inverts a state of an output qubit when an input is "1," and may be represented by a matrix of Equation 2 below.

$$CNG = \begin{bmatrix} 1 & 0 & 0 & 0 \\ 0 & 1 & 0 & 0 \\ 0 & 0 & 0 & 1 \\ 0 & 0 & 1 & 0 \end{bmatrix} \qquad \text{[Equation 2]}$$

The "CNOT gate" is represented by a line connecting one input ("•" sign) and one output ("+" sign in a circle).

The "NOT gate" may be a gate that inverts a state of a corresponding qubit and may be represented by a matrix of Equation 3 below.

$$NG = \begin{bmatrix} 0 & 1 \\ 1 & 0 \end{bmatrix} \qquad \text{[Equation 3]}$$

The "NOT gate" is represented by a "+" sign in a circle.

The addition unit 2150 may further require auxiliary qubits to perform modular addition.

For example, the addition unit 2150A further requires additional auxiliary qubits anc1[0] to anc1[4] and anc2[0] to anc2[2].

The addition unit 2150A may perform modular $2^N-1$ addition on a first input register X having qubits x[0] to x[4] and a second register Y having qubits y[0] to y[4] and may store an addition result in the second register Y.

Referring to FIGS. 14 and 15 again, the auxiliary register initialization units 2170-2 to 2170-N (hereinafter collectively referred to as 2170) may initialize the second auxiliary register C.

To this end, the auxiliary register initialization units 2170-2 to 2170-N have the same structure and function as the second auxiliary register setting units 2130-2 to 2130-N.

That is, each of the auxiliary register initialization units 2170-2 to 2170-N may left-circular-shift partial products of any one of first qubits $a_2$ to $a_N$ except for a lowest first qubit $a_1$ and second qubits $b_1$ to $b_N$ and may store the partial products in second auxiliary qubits $c_1$ to $c_N$.

In other words, a $p^{th}$ auxiliary register initialization unit 2170-$p$ may left-circular-shift partial products of a $p^{th}$ first qubit $a_p$ and the second qubits $b_1$ to $b_N$ (p−1) times to store the partial products in the second auxiliary qubits $c_1$ to $c_N$.

Figure 18:
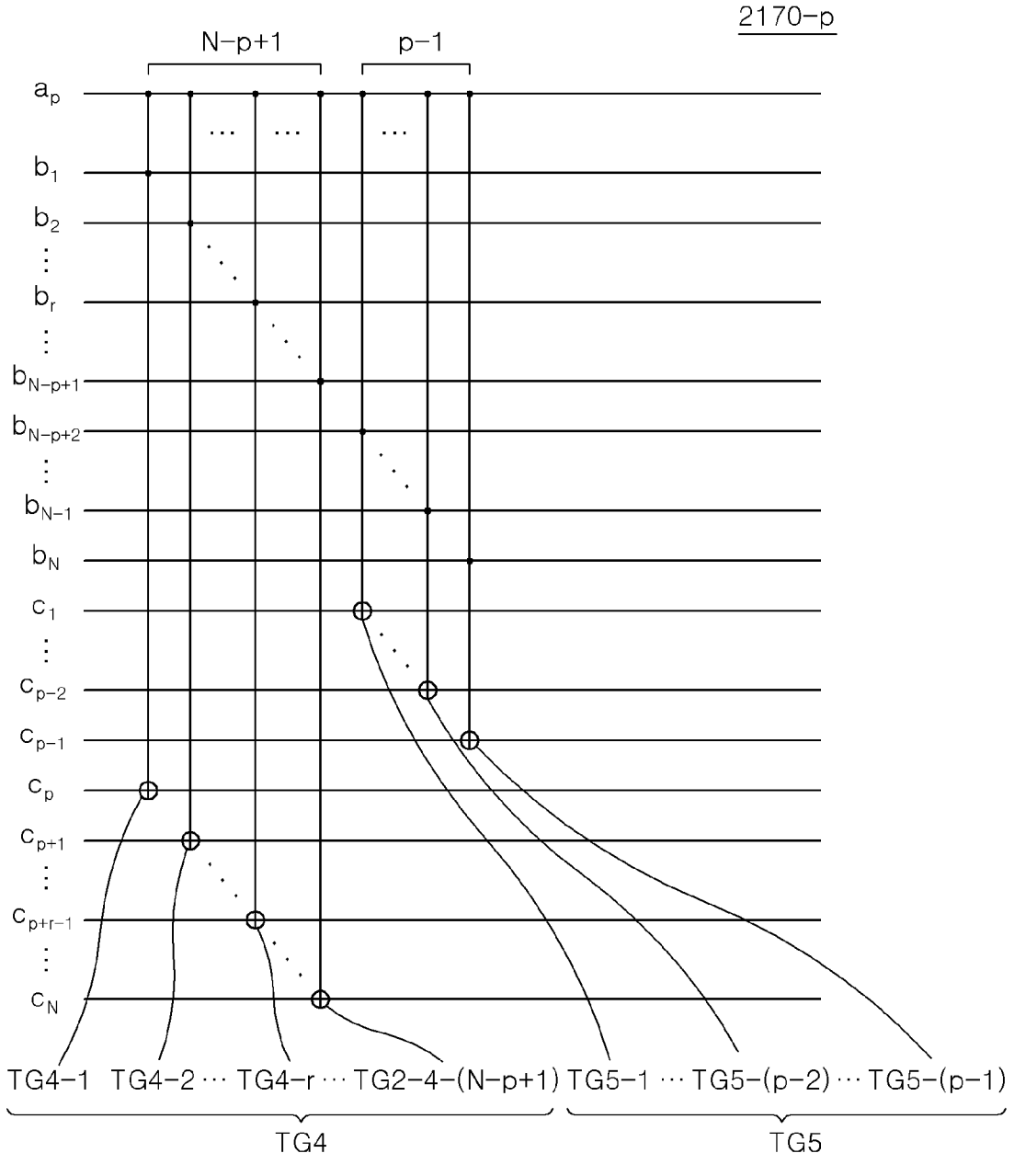
FIG. 18 is a circuit diagram illustrating an auxiliary register initialization unit shown in FIG. 15 in more detail.

FIG. 18 is a circuit diagram illustrating the auxiliary register initialization unit shown in FIG. 15 in more detail.

Referring to FIG. 18, the auxiliary register initialization unit may include (N−p+1) fourth Toffoli gates TG4-1 to TG4-(N−p+1) (hereinafter collectively referred to as TG4) and (p−1) fifth Toffoli gates TG5-1 to TG5-(p−1) (hereinafter collectively referred to as TG5).

Among the third Toffoli gates TG4-1 to TG4-(N−p+1), an $r^{th}$ fourth Toffoli gate TG4-$r$ may receive a $p^{th}$ first qubit $a_p$ and an $r^{th}$ second qubit $b_r$ among second qubits $b_1$ to $b_N$ and may output a $(p+r-1)^{th}$ second auxiliary qubit $c_{p+r-1}$ among second auxiliary qubits $c_1$ to $c_N$, wherein r is a natural number that is less than or equal to N−p+1.

That is, when both the $p^{th}$ first qubit $a_p$ and the $r^{th}$ second qubit br are "1," the $r^{th}$ fourth Toffoli gate TG4-$r$ may invert a state of the $(p+r-1)^{th}$ second auxiliary qubit $c_{p+r-1}$.

Among the fifth Toffoli gates TG5-1 to TG5-(p−1), an $s^{th}$ fifth Toffoli gate may receive the $p^{th}$ first qubit $a_p$ and an $(N-p+1+s)^{th}$ second qubit among the second qubits $b_1$ to $b_N$ and may output an $s^{th}$ second auxiliary qubit among the second auxiliary qubits $c_1$ to $c_N$, wherein s is a natural number that is less than or equal to p−1.

That is, when both the $p^{th}$ first qubit $a_p$ and the $(N-p+1+s)^{th}$ second qubit are "1," an $s^{th}$ fifth Toffoli gate TG5-$s$ may invert a state of a $(p+r-1)^{th}$-$s^{th}$ second auxiliary qubit.

Figure 20:
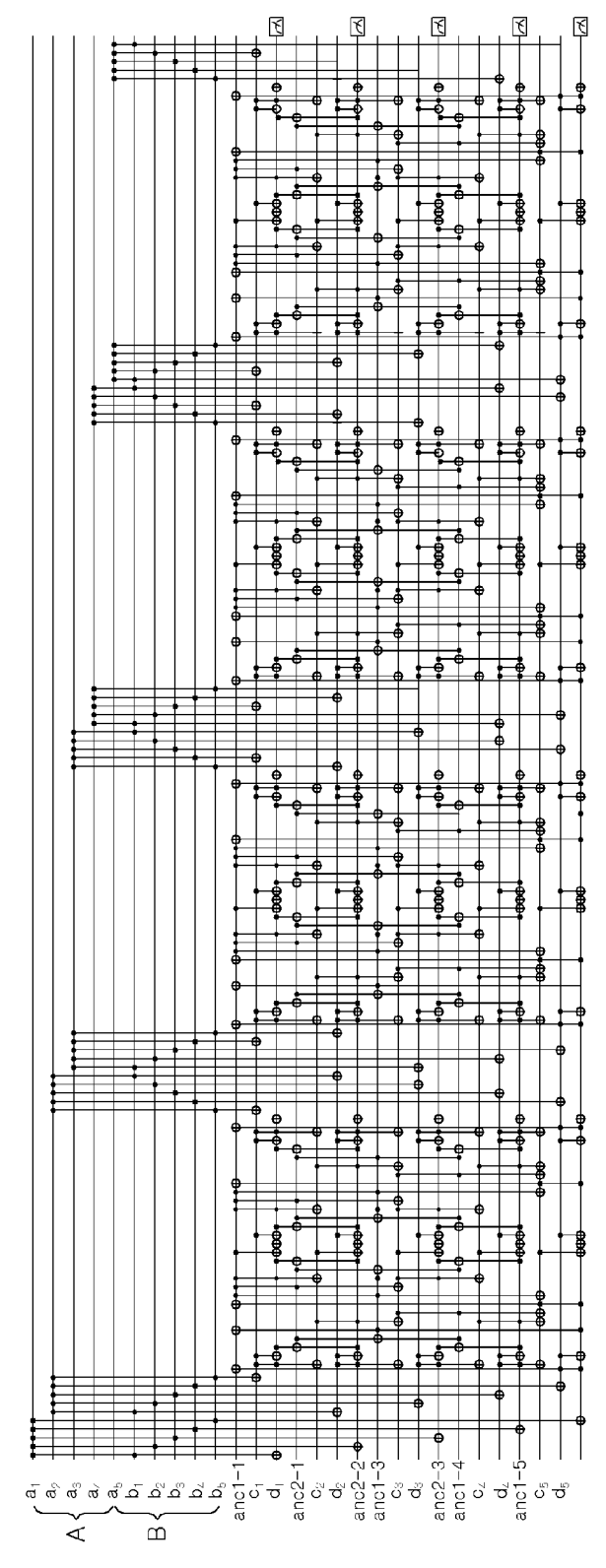
FIG. 20 is a circuit diagram illustrating an example of the quantum modular multiplier shown in FIG. 15 in more detail.

FIG. 20 is a circuit diagram illustrating an example of the quantum modular multiplier shown in FIG. 15 in more detail.

A quantum modular multiplier 2100A is an example of a circuit structure when N is 5, that is, when qubit registers A and B to be added have five digits.

The addition unit 2150A shown in FIG. 19 is applied to the quantum modular multiplier 2100A.

In addition to first auxiliary qubits $d_1$ to $d_5$ and second auxiliary qubits $c_1$ to $c_5$, the quantum modular multiplier 2100A requires seven additional auxiliary qubits anc1[0] to anc1[4] and anc2[0] to anc2[2].

A quantum modular multiplier 2100 requires 6N qubits and $11N^2$ gates when multiplying N-digit registers A and B and has a quantum circuit depth of $N^2/2$. That is, the quantum modular multiplier 2100 may perform a multiplication operation in a serial manner to reduce the numbers of qubits and gates.

Figure 21:
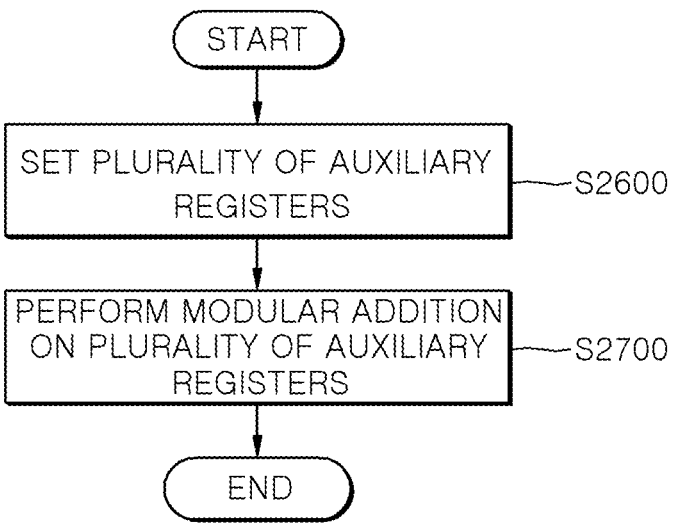
FIG. 21 is a flowchart for describing a quantum modular multiplication method according to a fifth embodiment of the present invention.
Figure 22:
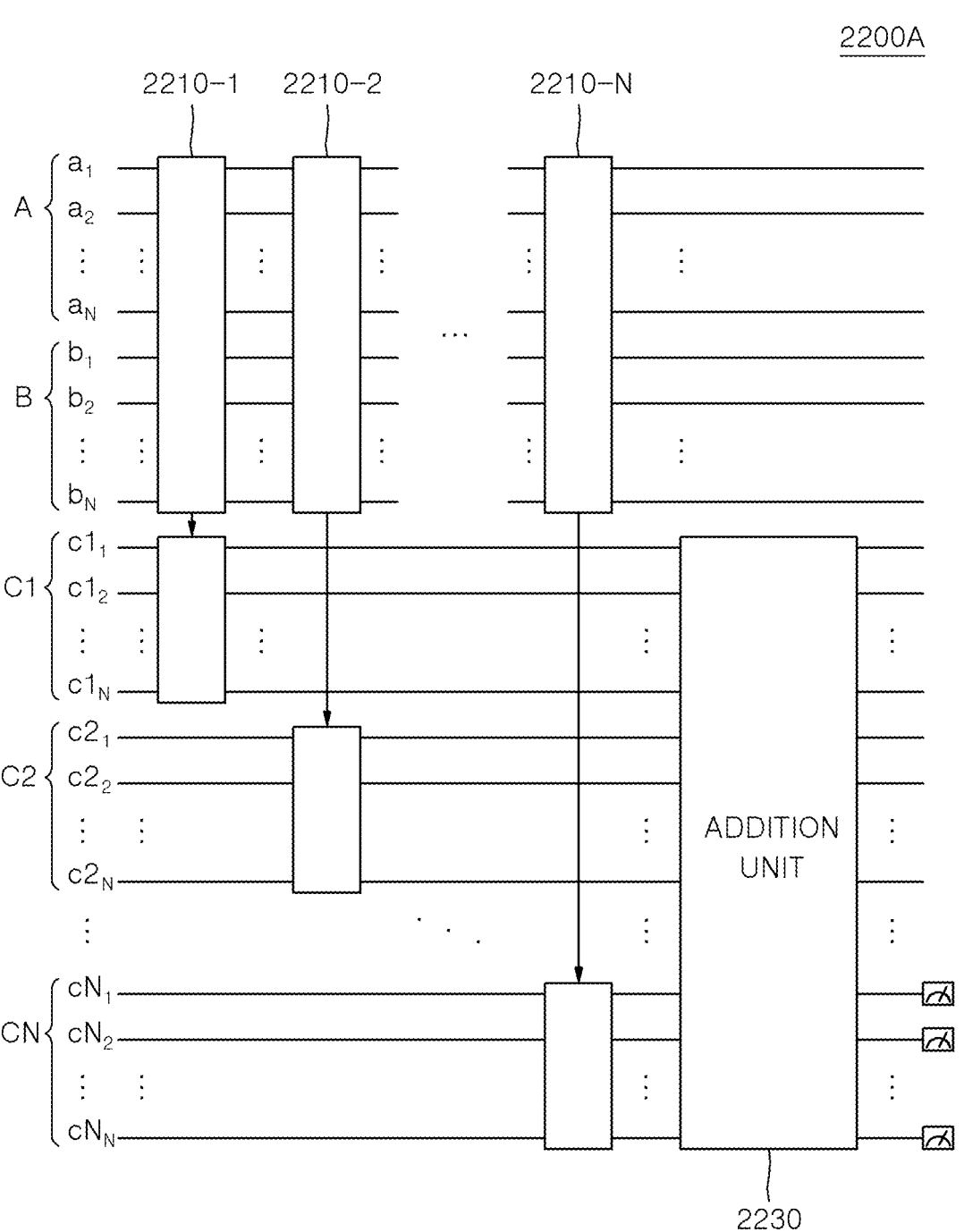
FIG. 22 is a block diagram illustrating a quantum modular multiplier according to the fifth embodiment of the present invention.

FIG. 21 is a flowchart for describing a quantum modular multiplication method according to a fifth embodiment of the present invention. FIG. 22 is a block diagram illustrating a quantum modular multiplier according to the fifth embodiment of the present invention.

Referring to FIGS. 21 and 22, a quantum modular multiplier 2200A may perform modular $2^N-1$ multiplication on a first qubit register A and a second qubit register B, which have N digits, in a parallel manner.

The quantum modular multiplier 2200A may include N auxiliary registers C1 to CN to perform multiplication on the first qubit register A and the second qubit register B which have N digits.

The auxiliary registers C1 to CN may include N auxiliary qubits $c1_1$ to $c1_N$, $c2_1$ to $c2_N$ . . . , and $cN_1$ to $CN_N$, respectively.

The quantum modular multiplier 2200A may left-circular-shift partial products of an $f^{th}$ first qubit $a_f$ among first qubits $a_1$ to $a_N$ and second qubits $b_1$ to $b_N$ (f−1) times to store the partial products in an ft auxiliary register Cf, wherein f is a natural number that is less than or equal to N (auxiliary register setting operation S2600).

After the auxiliary registers C1 to CN are all set, the quantum modular multiplier 2200A may perform modular $2^N-1$ addition on the auxiliary registers C1 to CN to store a modular addition result in one of the auxiliary registers C1 to CN, for example, an $N^{th}$ auxiliary register CN (adding operation S2700).

The quantum modular multiplier 2200A may perform modular $2^N-1$ addition on the auxiliary registers C1 to CN in a tournament manner to reduce a required calculation time.

That is, the quantum modular multiplier 2200A may set partial products of any one of the first qubits $a_1$ to $a_N$ and the second qubits $b_1$ to $b_N$ in the plurality of qubit registers C1 to CN and may perform modular addition on the qubit registers C1 to CN in a tournament manner to perform quantum modular multiplication.

The quantum modular multiplier 2200A may include N auxiliary register setting units 2210-1 to 2210-N (hereinafter collectively referred to as 2210) and an addition unit 2230.

Figure 23:
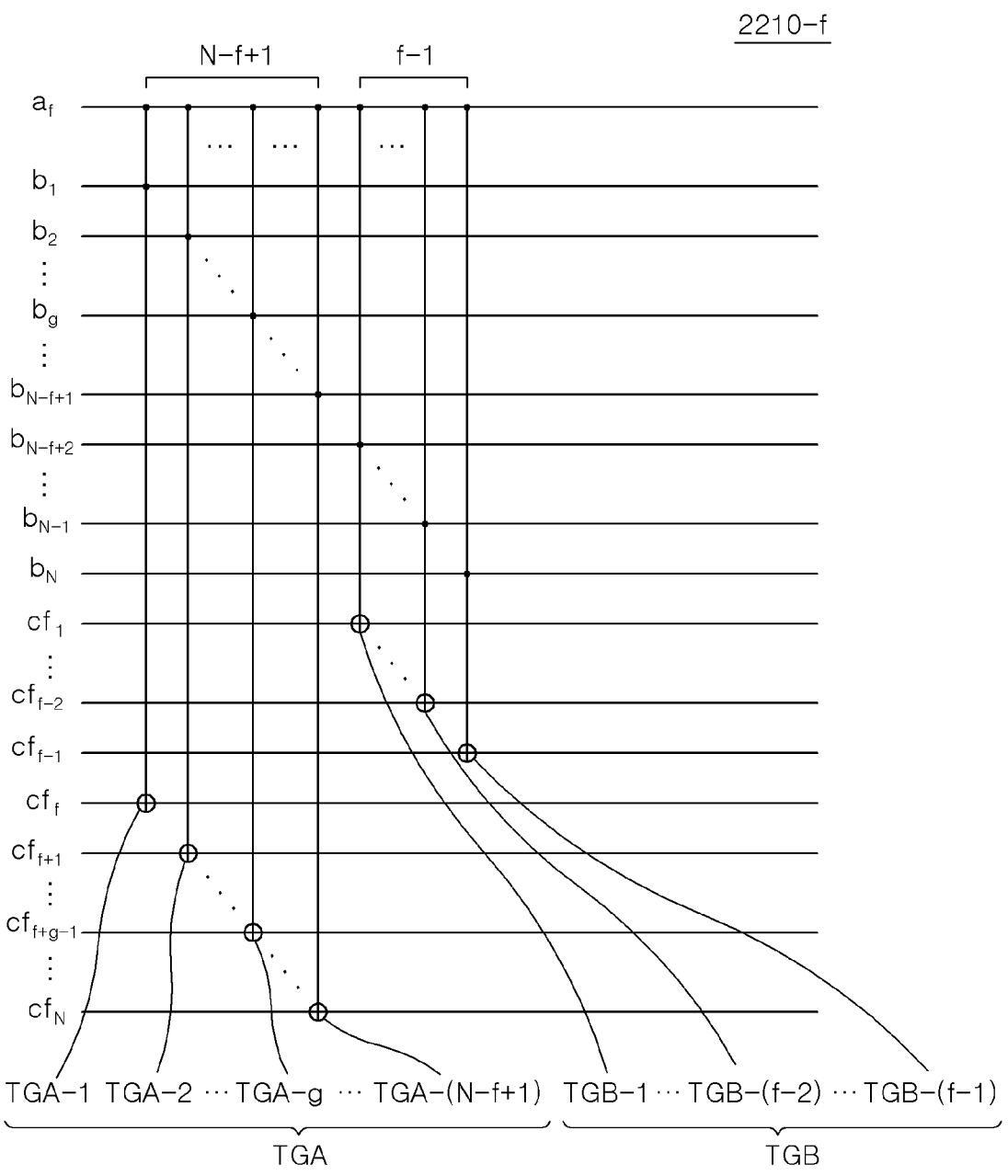
FIG. 23 is a circuit diagram illustrating an example of an auxiliary register setting unit shown in FIG. 22 in more detail.

FIG. 23 is a circuit diagram illustrating an example of the auxiliary register setting unit shown in FIG. 22 in more detail.

Referring to FIG. 23, an $f^{th}$ second auxiliary register setting unit 2210-f may include (N−f+1) first Toffoli gates TGA-1 to TGA-(N−f+1) and (f−1) second Toffoli gates TGB-1 to TGB-(f−1).

Among the first Toffoli gates TGA-1 to TGA-(N−f+1), a $g^{th}$ first Toffoli gate TGA-g may receive an $f^{th}$ first qubit $a_f$ among first qubits $a_1$ to $a_N$ and a $g^{th}$ second qubit $b_g$ among second qubits $b_1$ to $b_N$ and may output an $(f+g−1)^{th}$ auxiliary qubit $cf_{f+g-1}$ included in an $f^{th}$ auxiliary register Cf, wherein g is a natural number that is less than or equal to N−f+1.

That is, when both the $f^{th}$ first qubit $a_f$ and the $g^{th}$ second qubit $b_g$ are "1." the $g^{th}$ first Toffoli gate TGA-g may invert the $(f+g−1)^{th}$ auxiliary qubit $cf_{f+g-1}$ included in the $f^{th}$ auxiliary register Cf.

Among the second Toffoli gates TGB-1 to TGB-(f−1), a $t^{th}$ second Toffoli gate may receive the $f^{th}$ first qubit $a_f$ and an $(N−f+1+t)^{th}$ second qubit among the second qubits $b_1$ to $b_N$ and may output a $t^{th}$ second auxiliary qubit among the second auxiliary qubits $c_1$ to $c_N$, wherein t is a natural number that is less than or equal to f−1.

That is, when both the $f^{th}$ first qubit $a_f$ and the $(N−f+1+t)^{th}$ second qubit are "1," a $t^{th}$ second Toffoli gate TGB may invert a state of the $t^{th}$ second auxiliary qubit included in the in the $f^{th}$ auxiliary register Cf.

Figure 24:
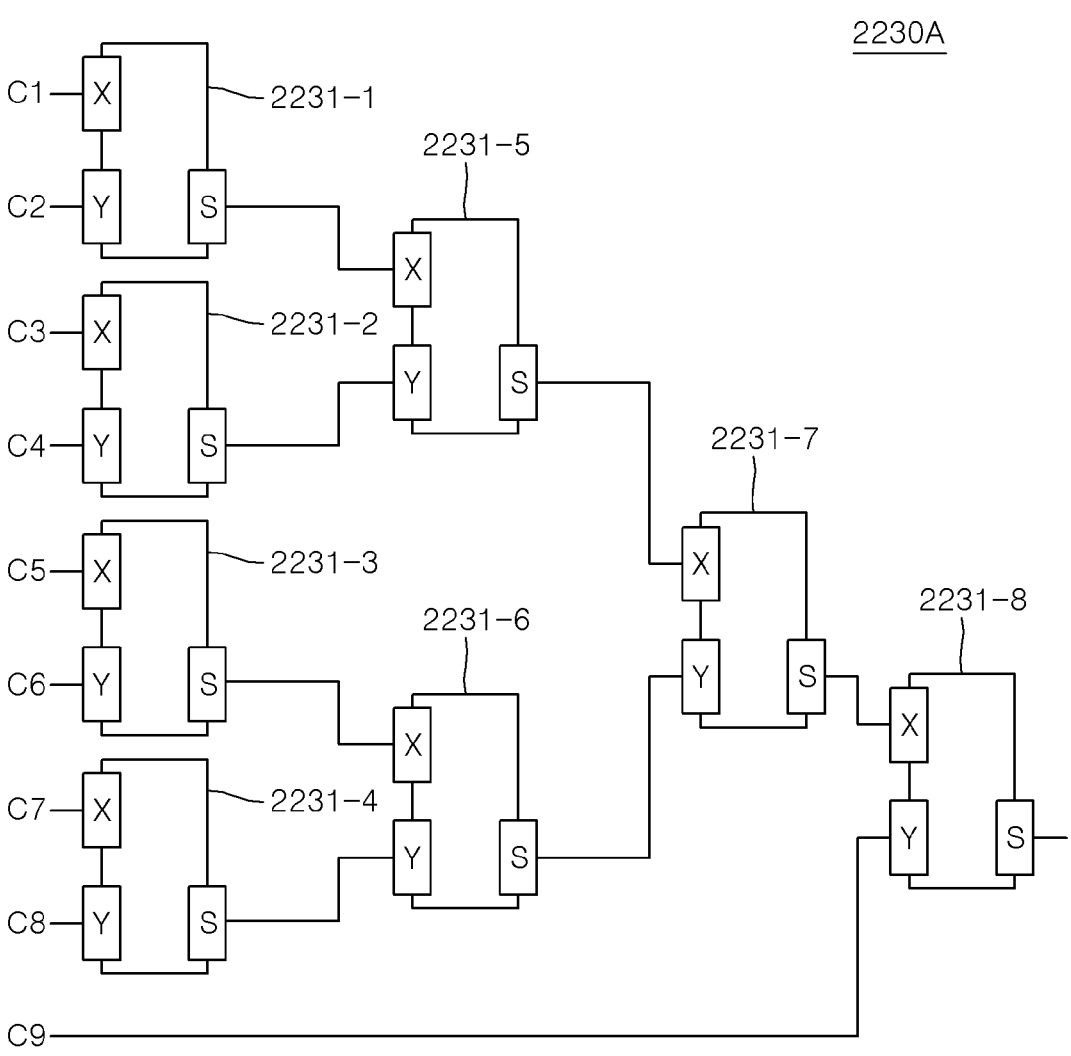
FIG. 24 is a block diagram illustrating an example of an addition unit shown in FIG. 22 in more detail.

FIG. 24 is a block diagram illustrating an example of the addition unit shown in FIG. 22 in more detail.

Referring to FIG. 24, an addition unit 2230A is shown when N is 9, that is, when qubit registers A and B to be added have nine digits.

The addition unit 2230 may include a plurality of modular $2^N-1$ quantum adders 2231. For example, the addition unit 2230A may include eight modular $2^N-1$ quantum adders 2231-1 to 2231-8 (hereinafter collectively referred to as 2231).

Each of the modular $2^N-1$ quantum adders 2231 may be provided as the addition unit 2150A shown in FIG. 19. However, a configuration of the addition unit 2150A is merely an example, and the technical spirit of the present invention is not limited thereto. For example, each of the modular $2^N-1$ quantum adders 2231 may be configured by being modified from the addition unit 2150A.

The modular $2^N-1$ quantum adders 2231 may perform modular $2^N-1$ addition on auxiliary registers C1 to C9 in a tournament manner.

In a first stage, the auxiliary registers C1 to C9 are paired and are subjected to modular $2^N-1$ addition by the modular $2^N-1$ quantum adders 2231-1 to 2231-4, and an addition result is stored in any one auxiliary register of a pair. In this case, since the number of the auxiliary registers C1 to C9 is odd, a ninth auxiliary register C9, which is not paired, is maintained without any change.

From a second stage, auxiliary registers storing a result of a previous stage are paired and are subjected to modular $2^N-1$ addition, and an addition result is stored in any one auxiliary register of a pair.

Finally, modular $2^N-1$ addition is performed in a tournament manner until a final addition result is stored in one auxiliary register.

Figure 25:
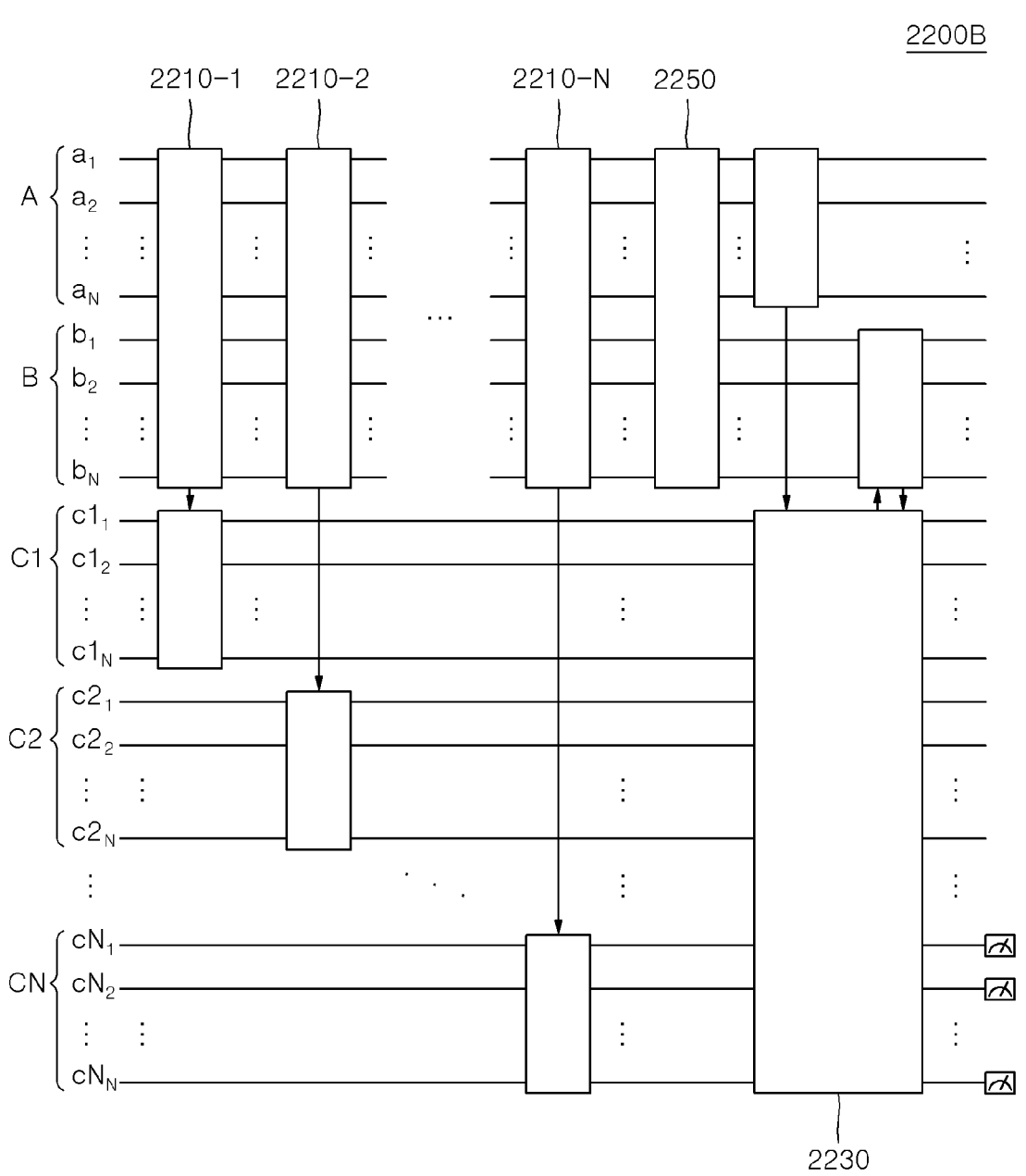
FIG. 25 is a block diagram illustrating a quantum modular multiplier according to a sixth embodiment of the present invention.

FIG. 25 is a block diagram illustrating a quantum modular multiplier according to a sixth embodiment of the present invention.

Since a quantum modular multiplier 2200B shown in FIG. 25 is substantially the same as the quantum modular multiplier 2200A shown in FIG. 22 except for a register initialization unit 2250, overlapping descriptions are omitted.

Referring to FIG. 25, the quantum modular multiplier 2200B may include the register initialization unit 2250.

After auxiliary registers C1 to CN are set by auxiliary register setting units 2210, the register initialization unit 2250 may initialize, that is, reset a first qubit register A and a second qubit register B.

The first qubit register A and the second qubit register B are initialized using the register initialization unit 2250, and initialized qubits $a_1$ to $a_N$ and $b_1$ to $b_N$ are used as additional qubits required when an addition unit 2230 performs modular addition, thereby reducing the number of qubits required by a system, that is, the quantum modular multiplier 2200B.

Figure 26:
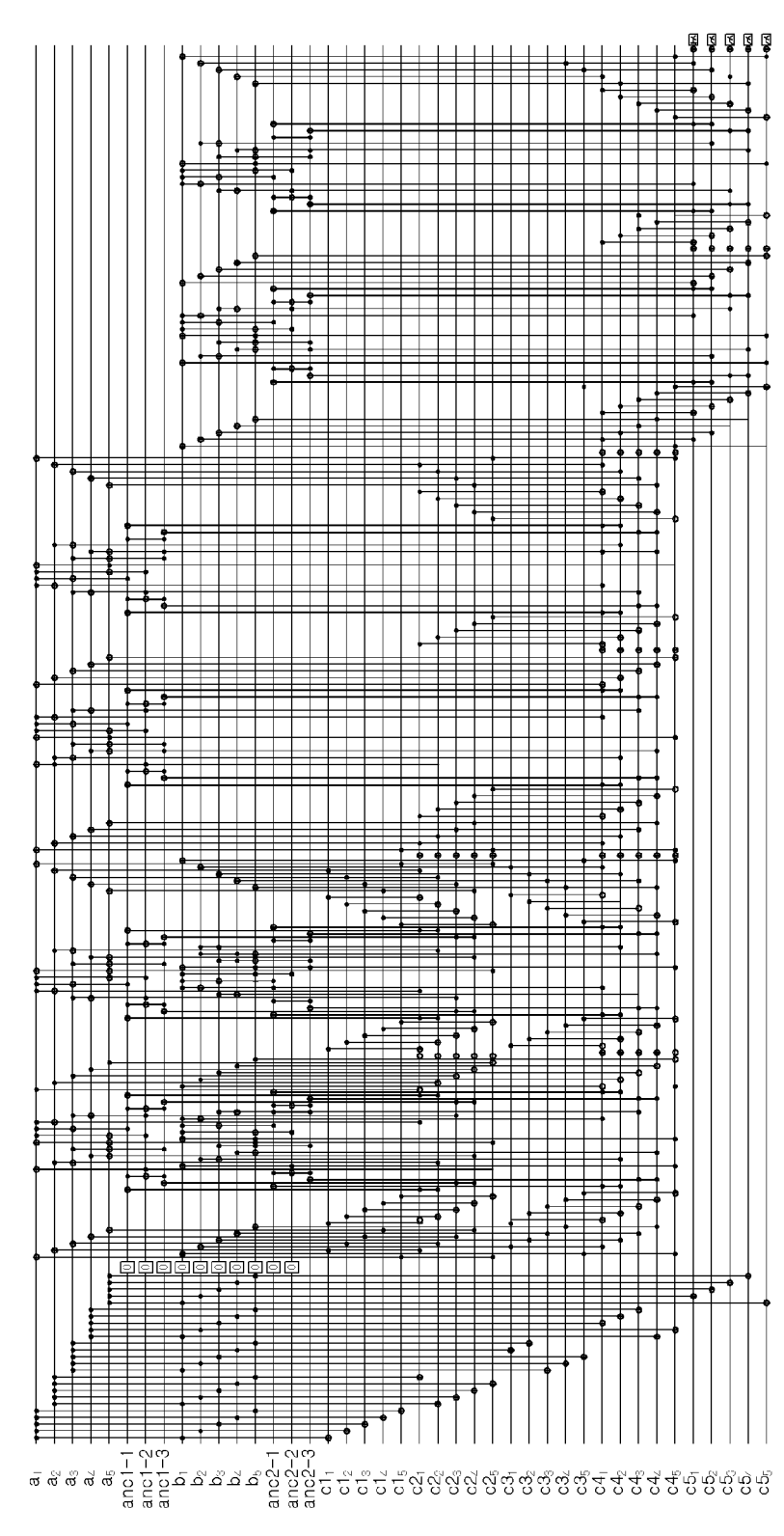
FIG. 26 is a circuit diagram illustrating an example of the quantum modular multiplier shown in FIG. 25 in more detail.

FIG. 26 is a circuit diagram illustrating an example of the quantum modular multiplier shown in FIG. 25 in more detail.

A quantum modular multiplier 2200C is an example of a circuit structure when N is 5, that is, when qubit registers A and B to be added have five digits.

The addition unit 2150A shown in FIG. 19 may be applied to quantum modular adders of the quantum modular multiplier 2200C. However, in order to reduce the number of gates, in some of the quantum modular adders, the addition unit 2150A may be modified, and for example, some of the gates may be omitted.

As described above, the addition unit 2150A further requires five additional auxiliary qubits anc1[0] to anc1[4] and anc2[0] to anc2[2] (see FIG. 19), but the initialized first qubit register A and second qubit register B are used in an adding operation instead of additional auxiliary qubits, thereby reducing the number of required qubits.

A quantum modular multiplier 2200 requires $N^2$ qubits and $5N^2$ gates when multiplying N-digit registers A and B and has a quantum circuit depth of $2^N$. That is, the quantum modular multiplier 2200 may perform a multiplication operation in a parallel manner to reduce a quantum circuit depth.

While the present invention has been described with reference to embodiments shown in the drawings, these should be considered in a descriptive sense only, and it will be understood by those skilled in the art that various alterations and other equivalent embodiments may be made. Therefore, the true technical protection scope of the present invention should be determined by the technical spirit of the appended claims.

The invention claimed is:

1. A quantum modular multiplication circuit for multiplying first qubits having N digits by second qubits having N digits, wherein N is a natural number that is greater than or equal to 2, the quantum modular multiplication circuit comprising:

a first auxiliary register configured to store partial products of a lowest first qubit among the first qubits and the second qubits in first auxiliary qubits;

a second auxiliary register configured to left-shift partial products of a $p^{th}$ first qubit among the first qubits and the second qubits (p–1) times and store the left-shifted partial products in second auxiliary qubits, wherein p is a natural number that is greater than or equal to 2 and less than or equal to N;

an addition unit including a modular $2^N$ quantum adder circuit and configured to perform modular addition on the first auxiliary qubits and the second auxiliary qubits and store a modular addition result in the first auxiliary qubits; and a third auxiliary register configured to initialize the second auxiliary qubits, wherein, while p increases from 2 to N, the second auxiliary register, the addition unit, and the third auxiliary register are repeatedly operated.

2. The quantum modular multiplication circuit of claim 1, wherein the first auxiliary register includes a plurality of first Toffoli gates configured to receive the lowest first qubit and a $q^{th}$ second qubit among the second qubits and output a $q^{th}$ first auxiliary qubit among the first auxiliary qubits, wherein q is a natural number that is less than or equal to N.

3. The quantum modular multiplication circuit of claim 2, wherein the second auxiliary register includes a plurality of second Toffoli gates configured to receive the $p^{th}$ first qubit and an $r^{th}$ second qubit among the second qubits and output a $(p+r–1)^{th}$ second auxiliary qubit among the second auxiliary qubits, wherein r is a natural number that is less than or equal to N–p+1.

4. The quantum modular multiplication circuit of claim 3, wherein the third auxiliary register includes a plurality of third Toffoli gates configured to receive the $p^{th}$ first qubit and the $r^{th}$ second qubit and output the (p+r–1)th second auxiliary qubit.

5. The quantum modular multiplication circuit of claim 1, wherein the modular $2^N$ quantum adder circuit is configured to receive the first auxiliary qubits and the second auxiliary qubits and output the second auxiliary qubits.

6. A quantum modular multiplication circuit for multiplying first qubits having N digits by second qubits having N digits, wherein N is a natural number that is greater than or equal to 2, the quantum modular multiplication circuit comprising:

a plurality of auxiliary registers configured to left-shift partial products of an $f^{th}$ first qubit among the first qubits and the second qubits (f–1) times and store the left-shifted partial products in an $f^{th}$ auxiliary register among the plurality of auxiliary registers, wherein f is a natural number that is less than or equal to N; and an addition unit including a plurality of modular $2^N$ quantum adder circuits and configured to perform modular addition on the plurality of auxiliary registers and store a modular addition result in one of the plurality of auxiliary registers.

7. The quantum modular multiplication circuit of claim 6, wherein each of the plurality of auxiliary registers includes a plurality of Toffoli gates configured to receive the $f^{th}$ first qubit and a $g^{th}$ second qubit among the second qubits and output an $(f+g–1)^{th}$ auxiliary qubit among the plurality of auxiliary registers, wherein g is a natural number that is less than or equal to N–f+1.

8. The quantum modular multiplier multiplication circuit of claim 6, wherein the plurality of modular $2^N$ quantum adder circuits are configured to perform the modular addition on the plurality of auxiliary registers in a tournament manner.

9. A quantum modular multiplication circuit for multiplying first qubits having N digits by second qubits having N digits, wherein N is a natural number that is greater than or equal to 2, the quantum modular multiplication circuit comprising:

a first auxiliary register configured to store partial products of a lowest first qubit among the first qubits and the second qubits in first auxiliary qubits;

a second auxiliary register configured to left-circular-shift partial products of a $p^{th}$ first qubit among the first qubits and the second qubits (p–1) times and store the left-circular-shifted partial products in second auxiliary qubits, wherein p is a natural number that is greater than or equal to 2 and less than or equal to N;

an addition unit including a modular $2^N–1$ quantum adder circuit and configured to perform modular $2^N–1$ addition on the first auxiliary qubits and the second auxiliary qubits and store a modular addition result in the first auxiliary qubits; and a third auxiliary register configured to initialize the second auxiliary qubits, wherein, while p increases from 2 to N, the second auxiliary register, the addition unit, and the third auxiliary register are repeatedly operated.

10. The quantum modular multiplication circuit of claim 9, wherein the first auxiliary register includes a plurality of first Toffoli gates configured to receive the lowest first qubit and a $q^{th}$ second qubit among the second qubits and output a $q^{th}$ first auxiliary qubit among the first auxiliary qubits, wherein q is a natural number that is less than or equal to N.

11. The quantum modular multiplication circuit of claim 10, wherein the second auxiliary register includes:

a plurality of second Toffoli gates configured to receive the $p^{th}$ first qubit and an $r^{th}$ second qubit among the second qubits and output a $(p+r–1)^{th}$ second auxiliary qubit among the second auxiliary qubits, wherein r is a natural number that is less than or equal to N–p+1; and a plurality of third Toffoli gates configured to receive the $p^{th}$ first qubit and an $(N–p+1+s)^{th}$ second qubit among the second qubits and output an $s^{th}$ second auxiliary qubit among the second auxiliary qubits, wherein s is a natural number that is less than or equal to p–1.

12. The quantum modular multiplication circuit of claim 11, wherein the third auxiliary register includes:

a plurality of fourth Toffoli gates configured to receive the $p^{th}$ first qubit and the $r^{th}$ second qubit and output the $(p+r–1)^{th}$ second auxiliary qubit; and a plurality of fifth Toffoli gates configured to receive the $p^{th}$ first qubit and the $(N–p+1+s)^{th}$ second qubit and output the $s^{th}$ second auxiliary qubit.

13. The quantum modular multiplier multiplication circuit of claim 9, wherein the modular $2^N–1$ quantum adder circuit is configured to receive the first auxiliary qubits and the second auxiliary qubits and output the second auxiliary qubits.

14. A quantum modular multiplication circuit for multiplying first qubits having N digits by second qubits having N digits, wherein N is a natural number that is greater than or equal to 2, the quantum modular multiplication circuit comprising:

a plurality of auxiliary registers configured to left-circular-shift partial products of an $f^{th}$ first qubit among the first qubits and the second qubits (f–1) times and store the left-circular-shifted partial products in an $f^{th}$ auxiliary register among a plurality of auxiliary registers, wherein f is a natural number that is less than or equal to N; and an addition unit including a plurality of modular $2^N-1$ quantum adder circuits and configured to perform modular addition on the plurality of auxiliary registers and store a modular addition result in one of the plurality of auxiliary registers.

15. The quantum modular multiplication circuit of claim 14, wherein each of the plurality of auxiliary registers includes:

a plurality of first Toffoli gates configured to receive the $f^{th}$ first qubit and a $g^{th}$ second qubit among the second qubits and output an $(f+g-1)^{th}$ auxiliary qubit among the plurality of auxiliary registers, wherein g is a natural number that is less than or equal to $N-f+1$; and a plurality of second Toffoli gates configured to receive the $f^{th}$ first qubit and an $(N-f+1+t)^{th}$ second qubit among the second qubits and output a $t^{th}$ auxiliary qubit among the plurality of auxiliary registers, wherein t is a natural number that is less than or equal to $f-1$.

16. The quantum modular multiplication circuit of claim 14, wherein the plurality of modular $2^N-1$ quantum adder circuits are configured to perform the modular addition on the plurality of auxiliary registers in a tournament manner.

\* \* \* \* \*